(12) United States Patent
Nels et al.

(10) Patent No.: US 7,014,024 B2
(45) Date of Patent: Mar. 21, 2006

(54) SYSTEM AND METHOD FOR IMPROVING COOLING IN A FRICTION FACING ENVIRONMENT

(75) Inventors: Terry E. Nels, Beavercreek, OH (US); Matthew J. Trippel, Dayton, OH (US)

(73) Assignee: Sulzer Euroflamm US Inc., Dayton, OH (US)

( * ) Notice: Subject to any disclaimer, the term of this patent is extended or adjusted under 35 U.S.C. 154(b) by 0 days.

(21) Appl. No.: 10/458,926

(22) Filed: Jun. 11, 2003

(65) Prior Publication Data

US 2004/0251109 A1    Dec. 16, 2004

(51) Int. Cl.
F16D 13/72    (2006.01)

(52) U.S. Cl. .............. 192/70.12; 192/107 R; 192/113.36

(58) Field of Classification Search .......... 192/70.12, 192/70.14, 170 R, 113.36
See application file for complete search history.

(56) References Cited

U.S. PATENT DOCUMENTS

| | | |
|---|---|---|
| 1,860,147 A | 5/1932 | Hadley |
| 1,936,240 A | 11/1933 | Lane |
| 2,020,748 A | 11/1935 | Waseige |
| 2,144,223 A | 1/1939 | Klocke |
| 2,316,874 A | 4/1943 | Kraft |
| 2,330,856 A | 10/1943 | Adamson |
| 2,354,526 A | 7/1944 | Lapsley et al. |
| 2,516,544 A | 7/1950 | Breeze |
| 2,690,248 A | 9/1954 | McDowall |
| 2,728,421 A | 12/1955 | Butler |
| 2,841,262 A | 7/1958 | Zeidler |
| 2,850,118 A | 9/1958 | Byers |
| 2,899,845 A | 8/1959 | Nogrady, Sr. |
| 3,042,168 A | 7/1962 | Binder |
| 3,073,424 A | 1/1963 | Russell |
| 3,094,194 A | 6/1963 | Kershner |
| 3,198,295 A | 8/1965 | Fangman et al. |
| 3,250,349 A | 5/1966 | Bymes et al. |
| 3,347,345 A | 10/1967 | Rogers et al. |
| 3,412,831 A | 11/1968 | Marcheron |
| 3,412,836 A | 11/1968 | Wilmer |
| 3,476,228 A | 11/1969 | Pritchard |
| 3,491,865 A | 1/1970 | Stockton |
| 3,534,842 A | 10/1970 | Davison, Jr. |
| 3,871,934 A | 3/1975 | Marin |
| 3,885,659 A | 5/1975 | Smith |
| 3,897,860 A | 8/1975 | Borck et al. |
| 3,927,241 A | 12/1975 | Augustin |

(Continued)

FOREIGN PATENT DOCUMENTS

EP    0128758    12/1984

(Continued)

OTHER PUBLICATIONS

Select Powertrain Technologies. Design Review of Daimler Chrysler TCC Carbon Friction Facing. Nov. 19, 2001.

Primary Examiner—Richard M. Lorence
(74) Attorney, Agent, or Firm—Jacox Meckstroth & Jenkins

(57) ABSTRACT

A system and method are shown for reducing material in a core which receives a plurality of segments. The invention may further include a plurality of segmented pieces that are arranged to provide a plurality of gaps that lie in a predetermined sweep angle and that may comprise a scoop for facilitating channeling fluid into a gap between adjacent material segments. Various manufacturing approaches are also disclosed for manufacturing and assembling a ring for use in a traditional transmission or clutch plate manufacturing and assembly system.

94 Claims, 13 Drawing Sheets

U.S. PATENT DOCUMENTS

| | | | |
|---|---|---|---|
| 3,937,303 | A | 2/1976 | Allen et al. |
| 3,972,400 | A | 8/1976 | Howells |
| 4,011,930 | A | 3/1977 | Coons et al. |
| 4,027,758 | A | 6/1977 | Gustavsson et al. |
| 4,045,608 | A | 8/1977 | Todd |
| 4,068,747 | A | 1/1978 | Snoy |
| 4,139,085 | A | 2/1979 | Kanbe et al. |
| 4,260,047 | A | 4/1981 | Nels |
| 4,267,912 | A | 5/1981 | Bauer et al. |
| 4,280,609 | A | 7/1981 | Cruise |
| 4,287,978 | A | 9/1981 | Staub, Jr. |
| 4,291,794 | A | 9/1981 | Bauer |
| 4,358,001 | A | 11/1982 | Iverson |
| 4,396,100 | A | 8/1983 | Eltze |
| 4,449,621 | A | 5/1984 | F'Geppert |
| 4,674,616 | A | 6/1987 | Mannino, Jr. |
| 4,700,823 | A | 10/1987 | Winckler |
| 4,726,455 | A | 2/1988 | East |
| 4,770,283 | A | 9/1988 | Putz et al. |
| 4,878,282 | A | 11/1989 | Bauer |
| 4,913,267 | A | 4/1990 | Campbell et al. |
| 4,917,743 | A | 4/1990 | Gramberger et al. |
| 4,986,397 | A | 1/1991 | Vierk |
| 4,995,500 | A | 2/1991 | Payvar |
| 5,038,628 | A | 8/1991 | Kayama |
| 5,076,882 | A | 12/1991 | Oyanagi et al. |
| 5,094,331 | A | 3/1992 | Fujimoto et al. |
| 5,097,932 | A | 3/1992 | Flotow et al. |
| 5,101,953 | A | 4/1992 | Payvar |
| 5,105,522 | A | 4/1992 | Gramberger et al. |
| 5,134,005 | A | 7/1992 | Wada et al. |
| 5,143,192 | A | 9/1992 | Vojacek et al. |
| 5,176,236 | A | 1/1993 | Ghidorzi et al. |
| 5,207,305 | A | 5/1993 | Iverson |
| 5,332,075 | A | 7/1994 | Quigley et al. |
| 5,335,765 | A | 8/1994 | Takakura et al. |
| 5,439,087 | A | 8/1995 | Umezawa |
| 5,454,454 | A | 10/1995 | Easton et al. |
| 5,460,255 | A | 10/1995 | Quigley |
| 5,495,927 | A | 3/1996 | Samie et al. |
| 5,501,309 | A * | 3/1996 | Walth et al. ............... 192/3.29 |
| 5,551,549 | A | 9/1996 | Cooke et al. |
| 5,566,802 | A | 10/1996 | Kirkwood |
| 5,577,582 | A | 11/1996 | Lindsay |
| 5,615,758 | A | 4/1997 | Nels |
| 5,660,259 | A | 8/1997 | Peng et al. |
| 5,669,474 | A | 9/1997 | Dehrmann et al. |
| 5,671,835 | A | 9/1997 | Tanaka et al. |
| 5,682,971 | A | 11/1997 | Takakura et al. |
| 5,713,450 | A | 2/1998 | Quigley |
| 5,776,288 | A | 7/1998 | Stefanutti et al. |
| 5,799,763 | A | 9/1998 | Dehrmann |
| 5,819,888 | A | 10/1998 | Tamura et al. |
| 5,842,551 | A | 12/1998 | Nels |
| 5,858,511 | A | 1/1999 | Lisowsky |
| 5,878,860 | A | 3/1999 | Pavangat et al. |
| 5,897,737 | A | 4/1999 | Quigley |
| 5,921,366 | A | 7/1999 | Walth et al. |
| 5,934,435 | A | 8/1999 | Bauer |
| 5,954,172 | A | 9/1999 | Mori |
| 5,975,260 | A | 11/1999 | Fischer et al. |
| 5,998,311 | A | 12/1999 | Nels |
| 6,019,205 | A | 2/2000 | Willwerth et al. |
| 6,035,991 | A | 3/2000 | Willwerth et al. |
| 6,036,903 | A | 3/2000 | Kierbel et al. |
| 6,047,806 | A | 4/2000 | Sasse |
| 6,062,367 | A | 5/2000 | Hirayanagi et al. |
| 6,065,579 | A | 5/2000 | Nels |
| 6,135,256 | A | 10/2000 | Han et al. |
| 6,145,645 | A | 11/2000 | Kroll et al. |
| 6,170,629 | B1 | 1/2001 | Suzuki et al. |
| 6,203,649 | B1 | 3/2001 | Kremsmair et al. |
| 6,213,273 | B1 | 4/2001 | Menard et al. |
| 6,247,568 | B1 | 6/2001 | Takashima et al. |
| 6,273,228 | B1 | 8/2001 | Otto et al. |
| 6,290,046 | B1 | 9/2001 | Menard et al. |
| 6,293,382 | B1 | 9/2001 | Nishide et al. |
| 6,308,397 | B1 | 10/2001 | Nishimura et al. |
| 6,345,711 | B1 | 2/2002 | Sullivan |
| 6,370,755 | B1 | 4/2002 | Wakamori |
| 6,397,997 | B1 | 6/2002 | Kato |
| 6,401,898 | B1 | 6/2002 | Shimoi et al. |
| 6,409,006 | B1 | 6/2002 | Wakamori et al. |
| 6,439,363 | B1 | 8/2002 | Nels |
| 6,454,072 | B1 | 9/2002 | Merkel et al. |
| 6,497,312 | B1 | 12/2002 | Sasse et al. |
| 6,499,579 | B1 | 12/2002 | Ono et al. |
| 6,557,685 | B1 | 5/2003 | Hattori |
| 6,581,740 | B1 | 6/2003 | Szalony |
| 6,601,684 | B1 | 8/2003 | Collis et al. |
| 2002/0046912 | A1 * | 4/2002 | Suzuki ..................... 192/3.29 |
| 2003/0051967 | A1 * | 3/2003 | Kitaori et al. ........... 192/70.12 |
| 2004/0099371 | A1 | 5/2004 | Hardies et al. |

FOREIGN PATENT DOCUMENTS

| | | | |
|---|---|---|---|
| EP | | 0267027 A2 | 5/1988 |

* cited by examiner

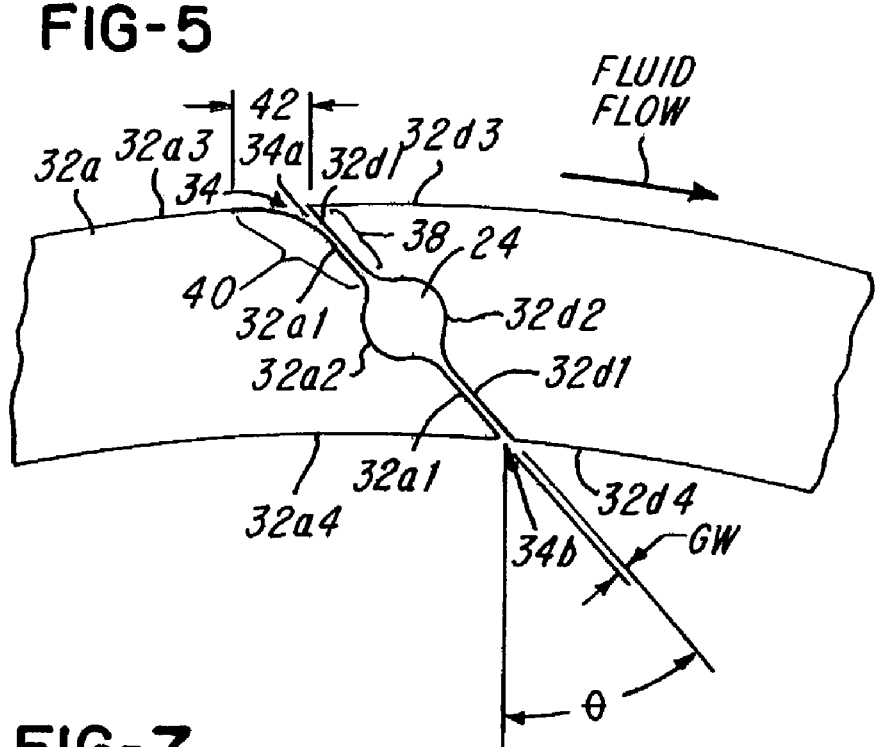
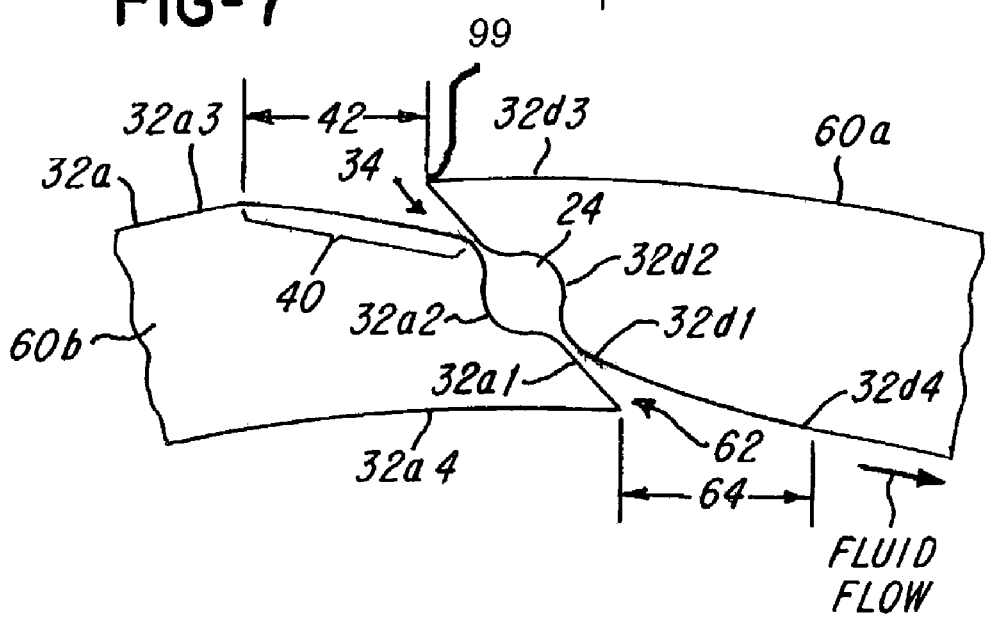

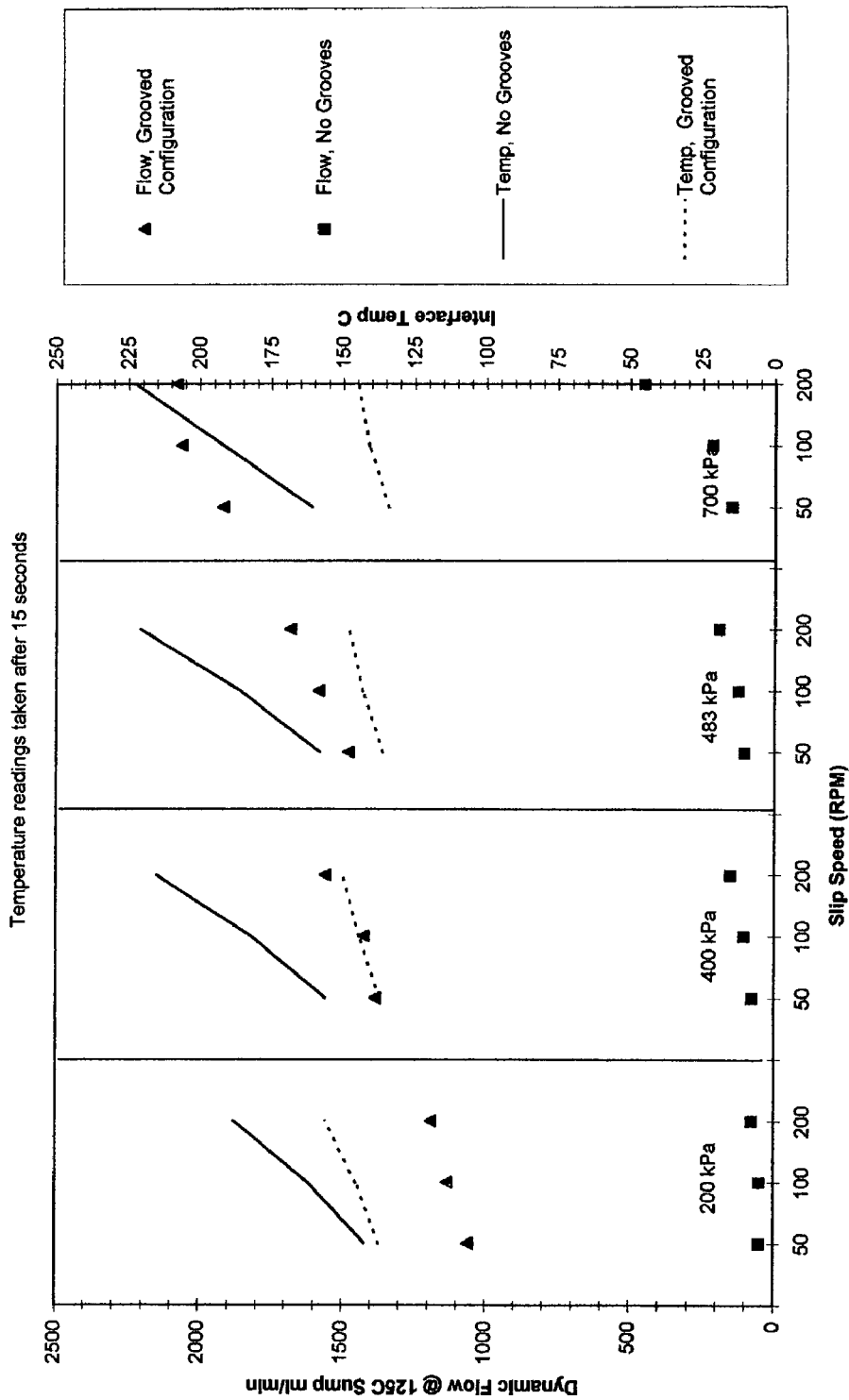

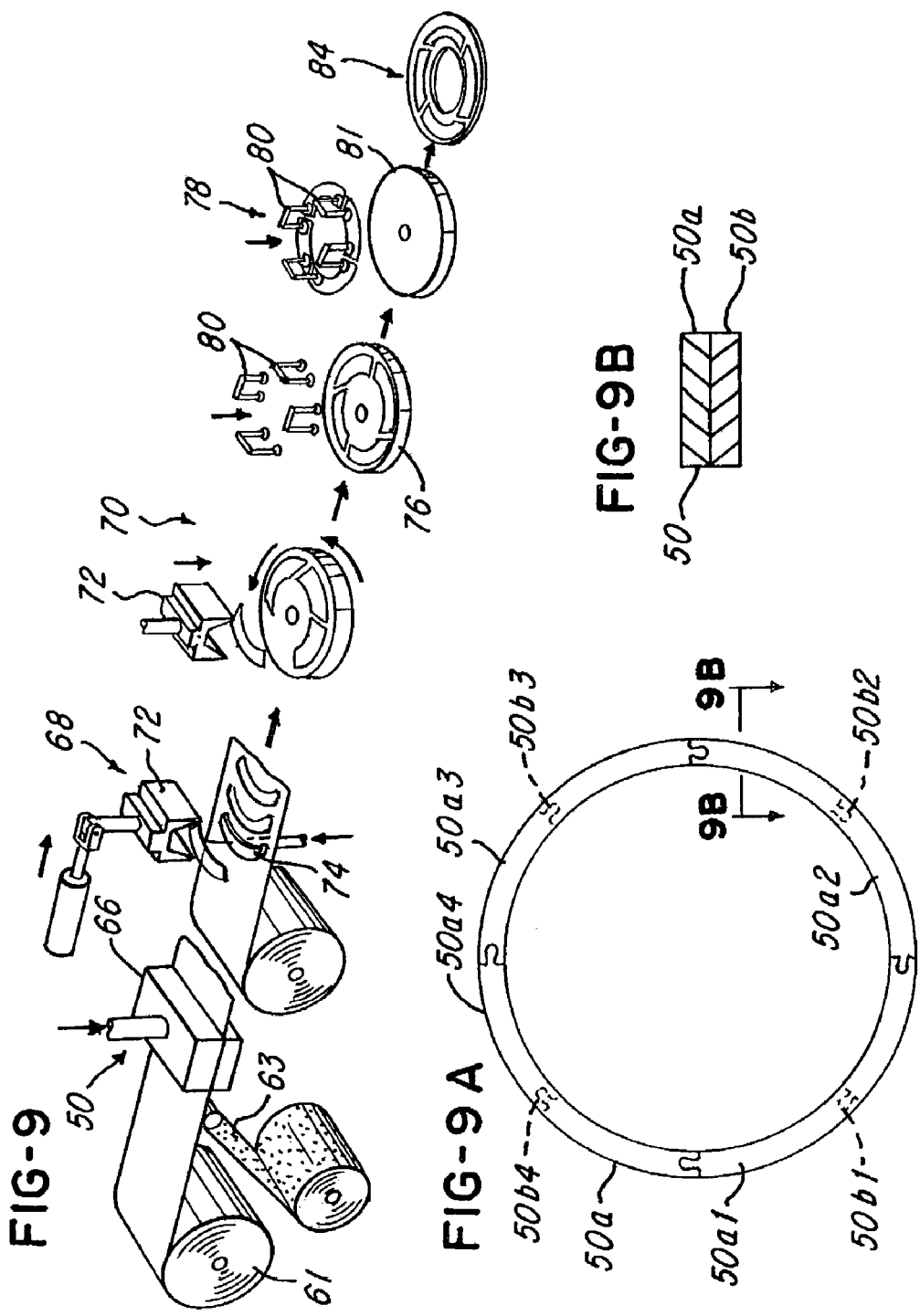

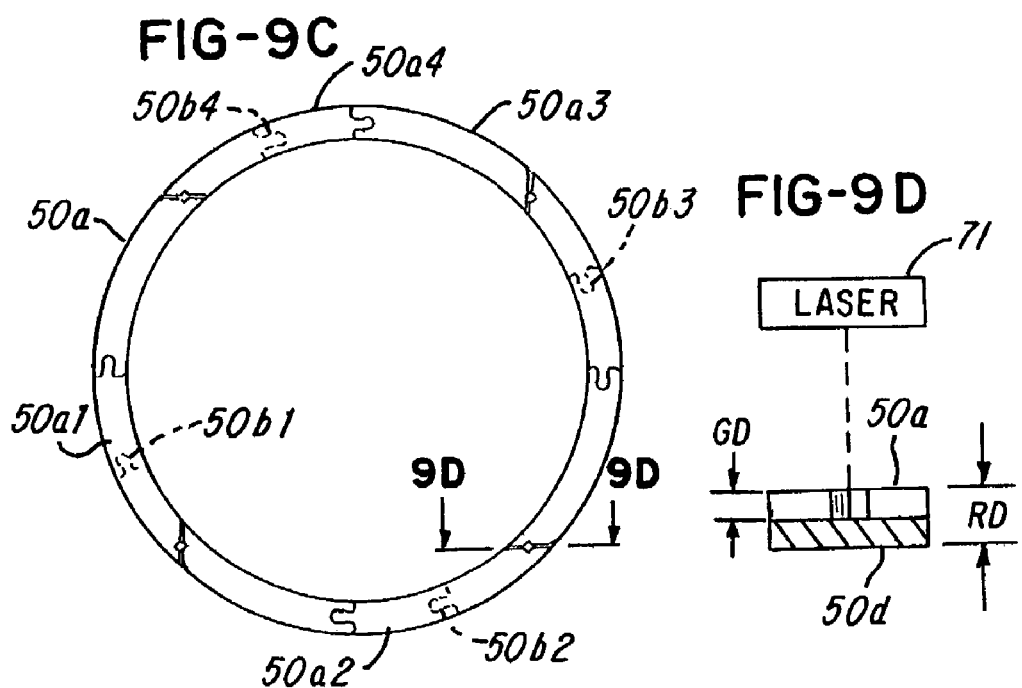
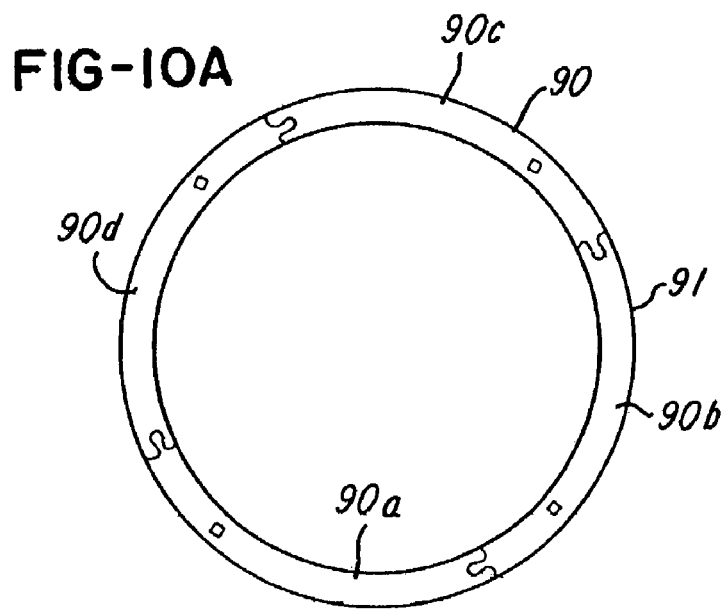

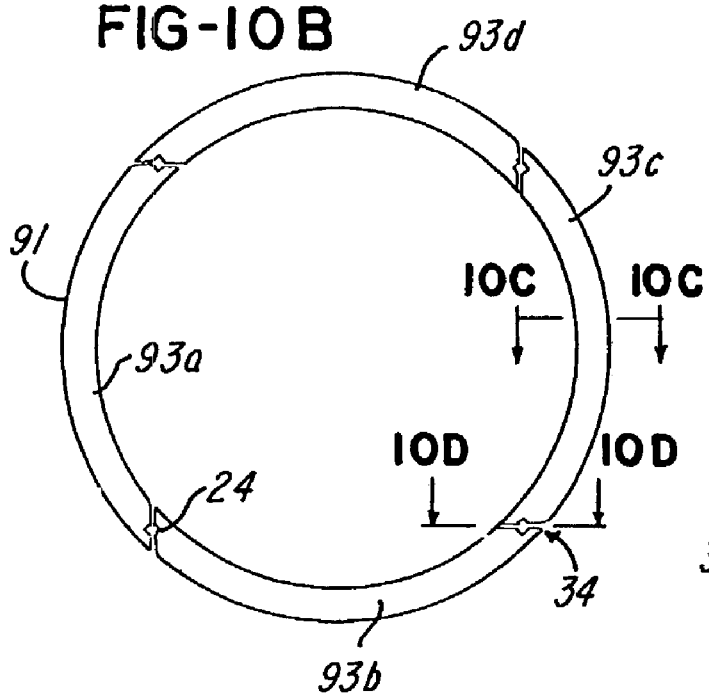
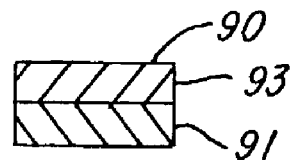
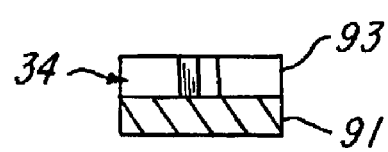
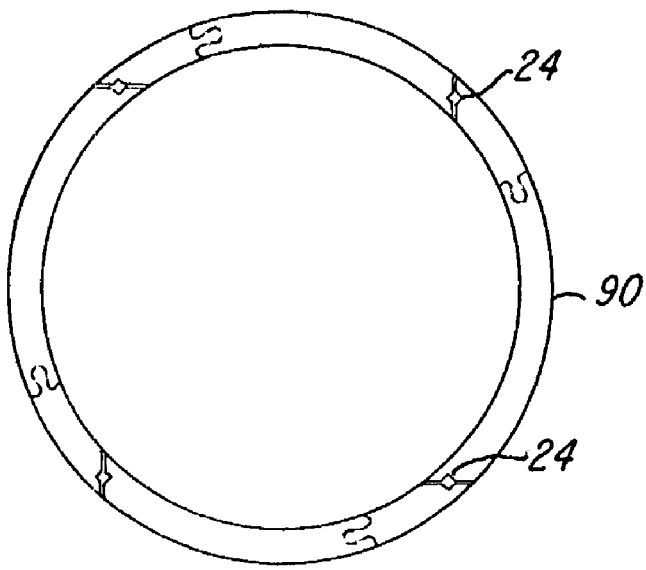

SYSTEM AND METHOD FOR IMPROVING COOLING IN A FRICTION FACING ENVIRONMENT

BACKGROUND OF THE INVENTION

1. Field of the Invention

This invention relates to a facing material and a core used in a transmission environment and to a method for controlling and increasing fluid flow to facilitate cooling an interface between an element having friction material and a cooperating reaction surface.

2. Description of Prior Art

In clutches, brakes, automatic transmissions, limited slip differentials, hoists and similar friction power transmissions and energy absorption devices, there is generally provided one or more sets of cooperating members in which one of the cooperating members drives the other. It is not uncommon for these cooperating members to move in a cooling medium or liquid, which is generally some type of lubricating oil, and frequently the fluid circulates about and between engaging surfaces of the cooperating member so as to continuously lubricate and cool them. In order to accomplish circulation of the cooling medium within blocker rings, clutch plates, transmission bands and the like, the prior art has provided grooves or slots directly in the engaging surfaces of one or both of the cooperating members or in friction materials fixed thereto. For example, such a friction material may be a brass coated or paper lined as seen in U.S. Pat. No. 4,267,912 to Bower et al; U.S. Pat. No. 4,878,282 to Bower; and U.S. Pat. No. 4,260,047 to Nels. Various fabric arrangements may also be provided to facilitate cooling and such an arrangement is shown in U.S. Pat. No. 5,842,551 to Nels. Moreover, U.S. Pat. No. 5,460,255 to Quigley and U.S. Pat. No. 6,019,205 to Wilworth disclose method and apparatus for lined clutch plates and universal segmented friction materials used thereon.

Forming grooves within the friction materials of cooperating members not only adds complexity to the manufacturing of such friction material and the power transmission-absorption device, but also is limited in its ability to circulate cooling medium therethrough.

There is a need to facilitate decreasing the temperature at the interface between cooperating members and to provide a convenient and improved way of decreasing material costs for the cores on which the segments are located.

SUMMARY OF THE INVENTION

It is, therefore, a primary object of the invention to provide a system and method for facilitating cooling cooperating members in a friction environment such as in clutch, automatic transmission, limited slip differential, brake or similar friction power transmission and energy absorption device.

In one aspect, this invention comprises clutch plate comprising a core having a front side, a back side and a non-circular outer edge and a plurality of friction material components situated in spaced segments on at least one of the front side or back side.

In another aspect, this invention comprises a power transmission assembly comprising a plurality of friction plates, each separated by a reaction plate, at least one of the plurality of friction plates comprising a core having a front side, a back side and a non-circular outer edge and a plurality of friction material components situated in spaced segments on at least one of the front side or back side.

In yet another aspect, this invention comprises a method for increasing utilization of friction material used on a clutch plate, comprising the steps of providing a metal core having a front side, a back side and a non-circular outer edge, providing the friction material, processing the friction material to provide a plurality of friction material segments, and situating the plurality of friction material segments on at least one of the front side or back side.

In still another aspect, this invention comprises a clutch plate comprising a core, a plurality of friction material segments situated on the core such that at least two adjacent segments define a gap therebetween, gap being defined by a first edge of a first one of the plurality of segments and a second edge of a second one of the plurality of segments, the gap comprising a primary gap width and at least one of the first edge or second edge defining a sweep angle, the gap width and the sweep angle being selected to control flow through the gap to facilitate cooling the core and the plurality of friction material segments.

In another aspect, this invention comprises a power transmission assembly comprising a plurality of friction plates each separated by a reaction plate, at least one of the plurality of friction plates comprising core, a plurality of friction material segments situated on the core such that at least two adjacent segments define a gap therebetween, the gap being defined by a first edge of a first one of the plurality of segments and a second edge of a second one of the plurality of segments, the gap comprising a primary gap width and at least one of the first edge or second edge defining a sweep angle, the gap width and the sweep angle being selected to control flow through the gap to facilitate cooling at an interface between the plurality of friction material segments and a cooperation reaction surface.

In still another aspect, this invention comprises a method for increasing fluid flow with increased relative speed between an outer edge and an inner edge of a clutch plate, the method comprising the steps of: determining a gap width and a sweep angle for a gap between adjacent friction material segments, selecting a scoop shape, determining a radius or corner on a first edge, processing each of the plurality of segments so that a first edge is substantially straight and a second edge has at a least a portion that is curved to define the scoop, and arranging the adjacent friction material segments such that a first edge of a first segment is situated on the clutch plate to provide the sweep angle and in opposed relation to a second edge of a second segment which is situated at the gap width to cooperate with the first segment to define the scoop shape.

In yet another aspect, this invention comprises a process for assembling a plurality of friction material segments to a plate, comprising the steps of: providing a friction material supply, densifying friction material without a laminated adhesive if necessary, laminating an adhesive backing to the friction material supply, densifying the laminated friction material supply, processing the friction material supply to provide the plurality of friction material segments, transferring each of the plurality of friction material segments to the plate such that a predetermined size gap exists between each of the plurality of friction material segments, and heating the plate and the plurality of friction material segments and the plate to bond the plurality of friction material segments to the plate, and further densifying friction material on plate if necessary.

In still another aspect, this invention comprises a method for providing a plurality of spaced gaps in a friction material, comprising the steps of providing a friction material in a desired shape for mounting on a plate; lasering the friction material to provide the plurality of spaced gaps or stamping friction material in segments with the necessary end contour to provide a plurality of spaced gaps when assembled.

In still another aspect, this invention comprises a clutch plate comprising a plate, friction material situated on the plate, and the friction material being lasered to a predetermined depth in a plurality of locations to provide a plurality of spaced gaps in a friction material for permitting fluid to flow through the gap.

Other objects and advantages of the invention will be apparent from the following description, the accompanying drawings and the appended claims.

BRIEF DESCRIPTION OF ACCOMPANYING DRAWING

FIG. 5 is an enlarged fragmentary view of a gap, sweep angle and scoop;

FIG. 7 illustrates a scoop utilized on an inner circumferential edge and an outer circumferential edge;

FIGS. 8A–8C are various graphs illustrating features of the invention;

FIG. 9 is a schematic view of a manufacturing process in accordance with one embodiment of the invention;

FIGS. 9A–9D illustrate various features of a dual ring assembly and method;

FIGS. 10A–10F illustrate views of another dual ring assembly and method;

DETAILED DESCRIPTION OF PREFERRED EMBODIMENT

Figure 1:
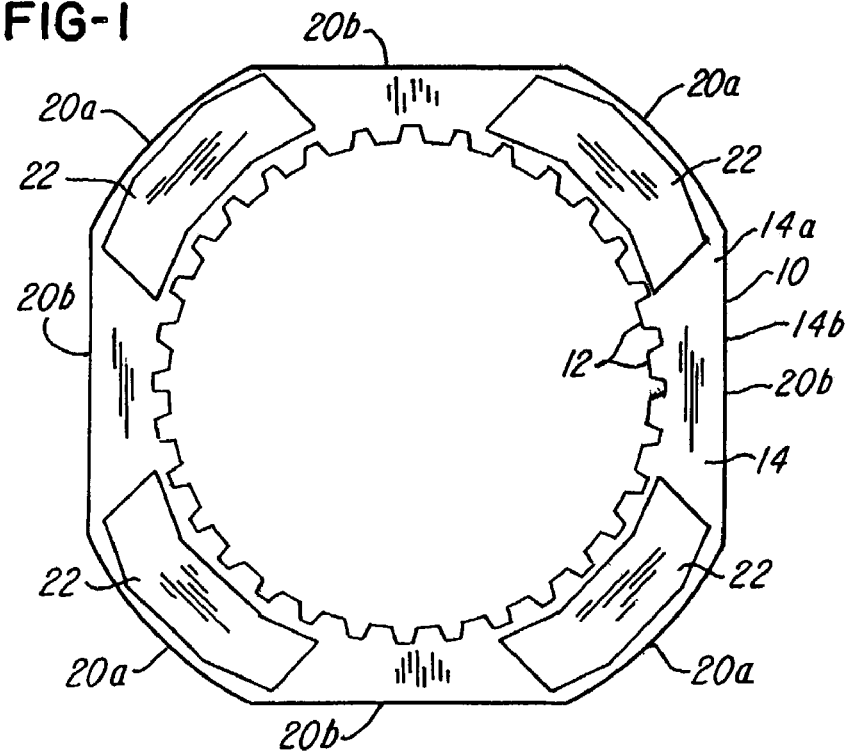
FIG. 1 is a view of a non-circular or clutch plate core or element.

Referring now to FIGS. 1–10E, a system and method are shown for improving the performance of cooling and the operation of, for example, a clutch plate in a power transmission assembly. Referring to FIGS. 1–2D, a clutch plate 10 is shown comprising a plurality of teeth 12 for mounting on a drive member (not shown) for rotatably driving the clutch plate 10. The clutch plate 10 comprises a core 14 that is metallic and comprises a first side 16 and a second side 18 which is opposite the first side.

The core 14 is metallic and comprises an outer edge 20 that is non-circular. Advantageously, the non-circular shape of the core 14 facilitates reducing material cost by decreasing the metallic material between the segments where the plurality of material segments is situated. As illustrated in FIG. 1, the edge 20 comprises a plurality of arcuate portions or segments 20a that are separated by substantially straight portions or segments 20b as shown.

Figure 2A:
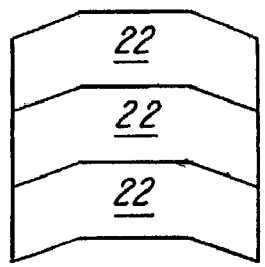
FIG. 2A is a view of a plurality of material segments punched or cut from a web of material.
Figure 2B:
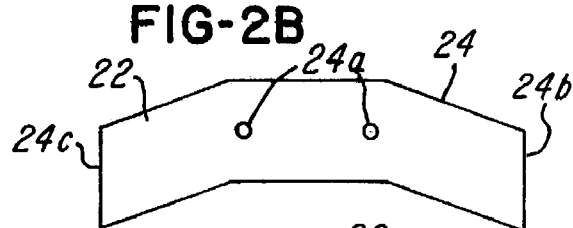
FIG. 2B is a view of the plurality of material segments shown in FIG. 2A illustrating a blunted chevron shape.
Figure 2C:
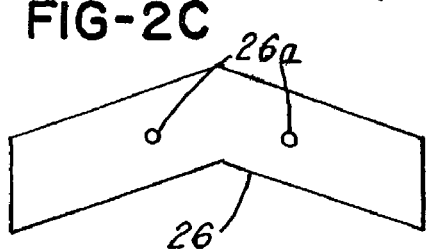
FIG. 2C is a view of a plurality of segments showing a chevron shape.
Figure 2D:
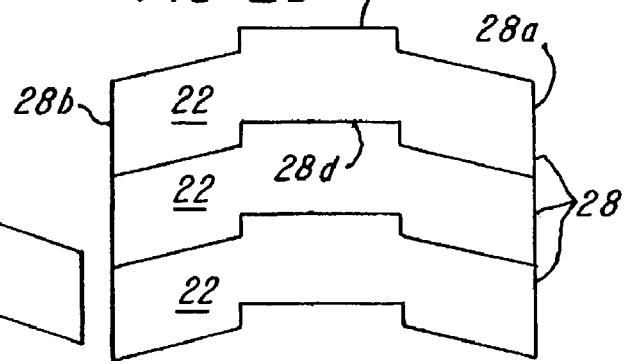
FIG. 2D is a view of a plurality of material segments showing a stepped shape.

A plurality of friction material segments or components 22 is situated at each of the arcuate segments 20a as shown. In the embodiment being described, each segment 20b comprises a material segment 22, such as the segments 22 having the blunted chevron shape illustrated in FIG. 2A. Conveniently, the blunted chevron shape permits the material segments to be cut from a web 63 (FIG. 9) of friction facing material in a manner that substantially reduces or eliminates excess material or scrap material. FIGS. 2B–2D illustrate other contemplated shapes. For example, FIG. 2B illustrates an enlarged view of the blunted chevron shape segment 24 shown in FIGS. 1 and 2A, FIG. 2C illustrates a non-blunted chevron shape segment 26, and FIG. 2D illustrates a stepped-shape segment 28. Again, all of these shapes facilitate cutting or punching the plurality of material components or segments 22–28 from the web 63 (FIG. 9) of material in a manner that substantially reduces or eliminates altogether material loss or scrap.

Referring to FIGS. 2B–2C, notice that the segments 24 and 26 may optionally comprise a plurality of locating holes, such as locating apertures or holes 24a in FIG. 2B or apertures 26a in FIG. 2C, to facilitate locating the segments 24 and 26, respectively, onto the core 14 when the clutch plate 10 is manufactured. Note that each of the plurality of material components 24–28 comprises a pair of opposed sides, such as 24b and 24c in FIG. 2B that are substantially straight and parallel. As illustrated in FIG. 2D, note that the stepped shape of the segment 28 comprises opposed sides 28a and 28b that are substantially straight and parallel and opposed sides 28c and 28d that are stepped as shown.

In the embodiment being described, a plurality of clutch plates 10 comprising the features illustrated in FIGS. 1–2D may be assembled and used in a power transmission with each friction plate 10 being separated by a corresponding reaction plate (not shown) which is conventionally known.

Figure 12:
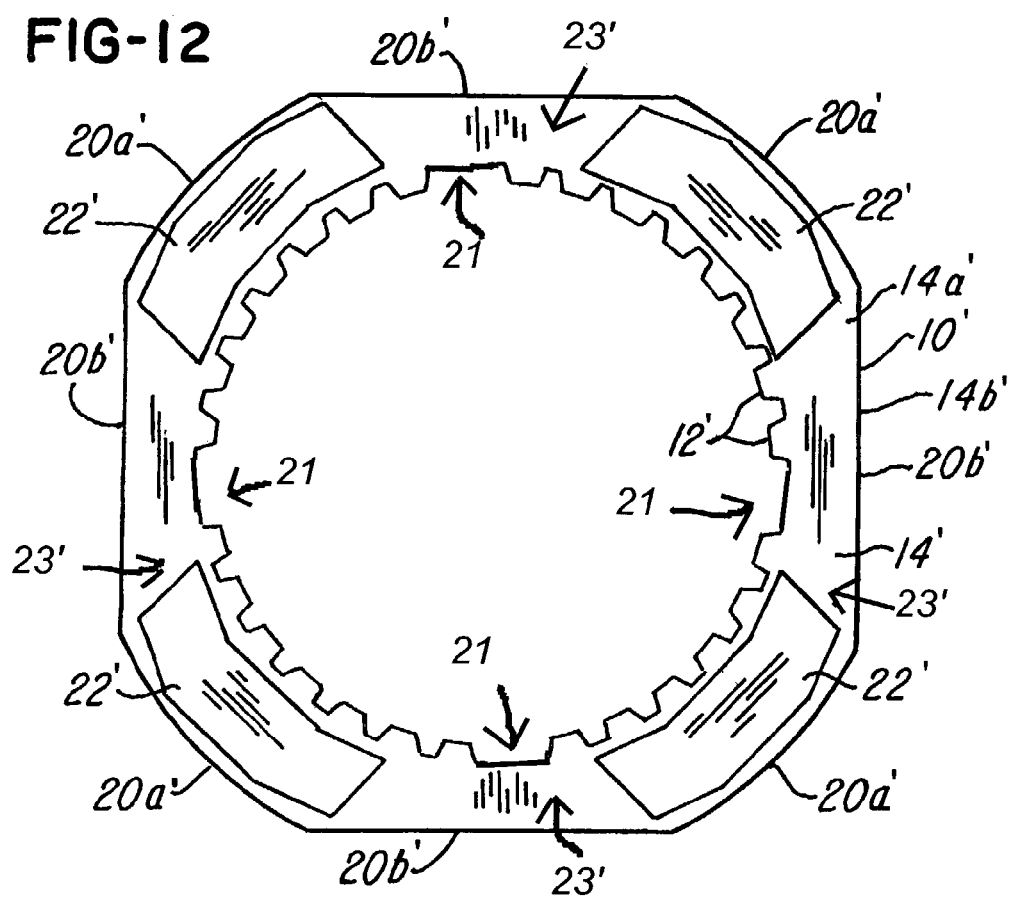
FIG. 12 is another embodiment showing a core tooth gap as shown.

Referring now to FIG. 12, another embodiment of the invention is shown. This embodiment is similar to the embodiment described earlier relative to FIG. 1 and like parts are identified with the same part numbers, except a prime mark ("'") mark has been added to the embodiment shown in FIG. 12. In this embodiment, note that a plurality of large groove areas 21' situated on an interior circumferential surface to facilitate pumping fluid through the areas 23'. These grooves may be defined by eliminating one or more of the teeth 12 (FIG. 12), thereby increasing fluid flow across the core 10 which, in turn, facilitates cooling.

Advantageously, the invention provides means and method for increasing utilization of friction material used on a core or plate, such as the core 14 of clutch plate 10. By providing the core 14 having the front side 14a and back side 14b and non-circular outer edge 20, less material is required to manufacture the core, thereby reducing the amount of scrap during the manufacturing process. By providing the predesigned friction material segment shapes illustrated in FIGS. 2A–2D, the utilization of the friction material and minimization of material scrap during the manufacturing process is improved.

Figure 3:
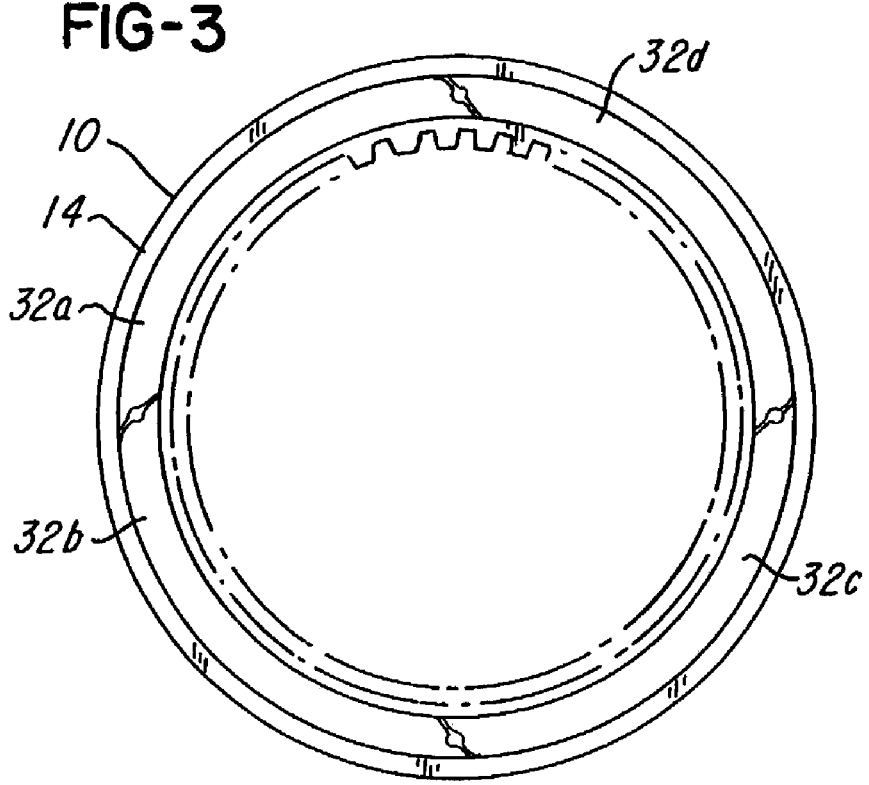
FIG. 3 is a view showing a ring in accordance with one embodiment of the invention.
Figure 4:
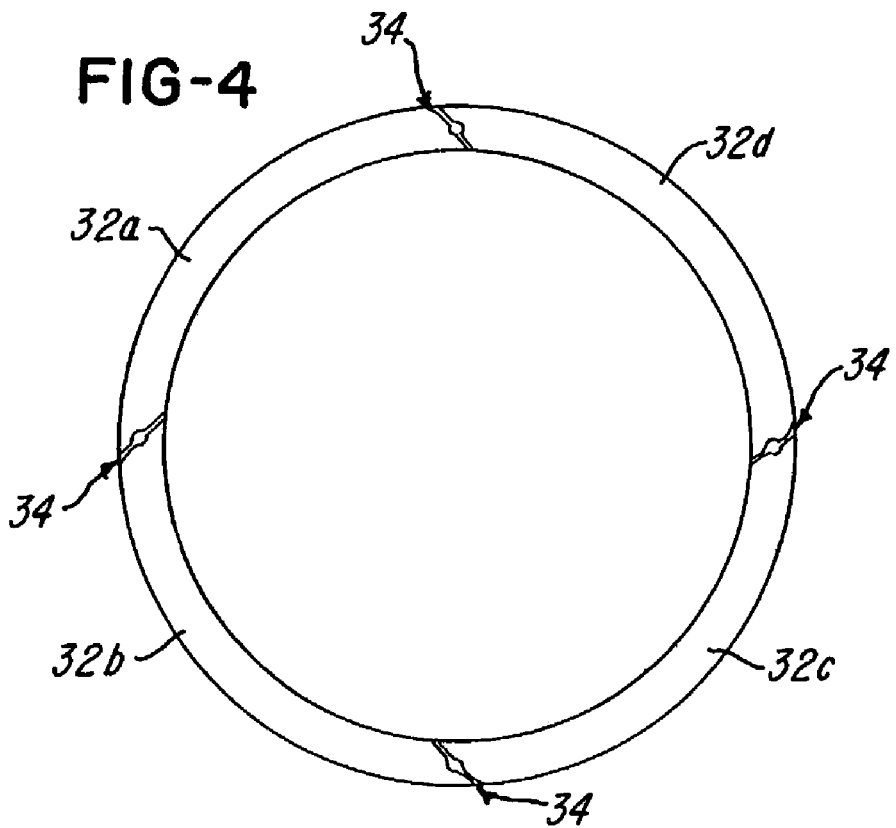
FIG. 4 is a view similar to FIG. 3 except without a core.

FIGS. 3–8C illustrate another embodiment of the invention. As shown in FIGS. 3 and 4, a plate or core 10 is shown comprising a circular shape as illustrated or may comprise the features of a non-circular outer edge as illustrated in the embodiment shown in FIGS. 1–2C. The core 10 comprises a plurality of material segments 32 that are situated on the core 10 such that at least two adjacent segments define a gap 34 therebetween.

Referring to FIG. 5, an exploded fragmentary view of two adjacent segments 32a and 32d is shown. Note that the segment 32d comprises a first edge 32d1 and segment 32a comprises a second edge 32a1. As illustrated in FIG. 5, the edge 32d1 comprises a portion 38 that is substantially straight. A corner 99 (FIG. 7), created by edge 32d3 and 32d1, can be a sharp corner or a radius of varying size to facilitate the amount of desired fluid flow through gap 34. Note that the second edge 32a1 of segment 32a comprises a portion 40 that is substantially curved. In the embodiment being described, each of the edges 32a1 and 32d1 may comprise a recessed area or aperture 32a2 and 32d2 that cooperate to define a locating aperture to facilitate locating the segments 32a and 32d when the clutch plate 10 is assembled using the manufacturing process described later herein. The feature defined by 32a2 and 32d2 serves as a fluid reservoir to facilitate the increase the volume of fluid contained between the two adjacent segments at any instant. The depth of the groove defined by edge 40 and 32a1, and edge 38 and 32d1 is dictated by the desired fluid flow rate through the groove 34.

Figure 6A:
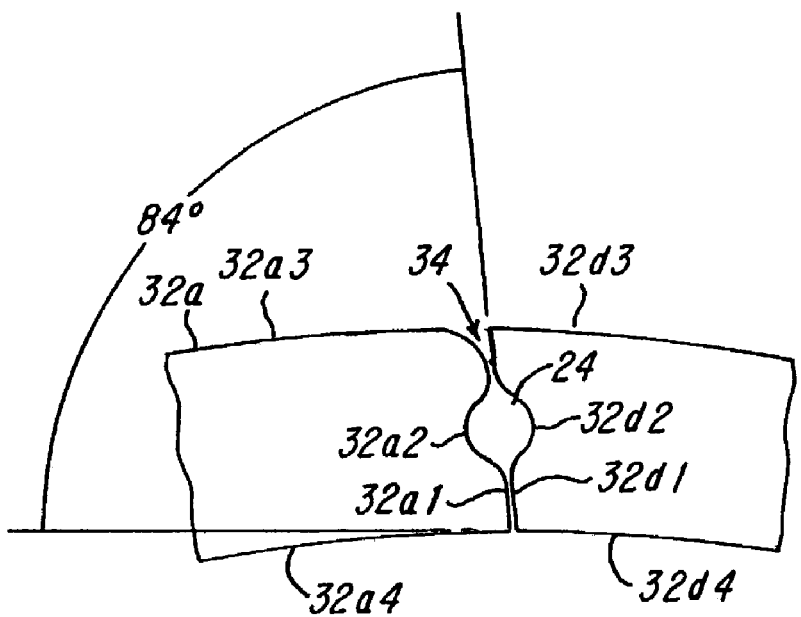
FIGS. 6A–6B illustrate varying sweep angles.
Figure 6B:
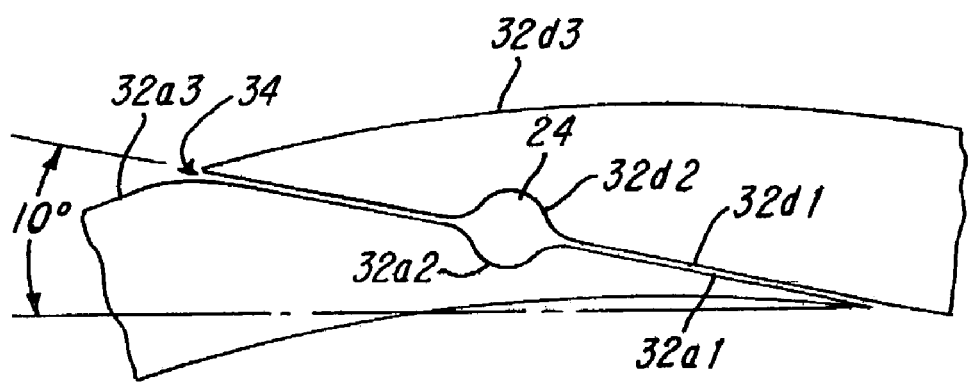

The gap 34 lies in a plane P that defines a predetermined angle or sweep angle θ, as illustrated in FIG. 5. In the embodiment being described, the predetermined angle θ may be between approximately 10–84 degrees, as shown in FIGS. 6A and 6B.

The gap 34 comprises a gap width GW (FIG. 5). The gap width GW and sweep angle θ and corner radius 99 are selected to control the flow through the gap 34 to facilitate increasing cooling and reducing a temperature interface between the plurality of friction material segments 32a–32d and a cooperating reaction or friction surface (not shown).

The curved area or portion 40 is shaped to define a scoop or opening dimension 42 of predetermined size. Referring back to FIG. 5, the segment 32d comprises the edges 32d1, 32d3 and 32d4. Likewise, segment 32a comprises the edges 32a1, 32a3 and 32a4. Note that the edges 32a1, 32a3, 32d1 and 32d3 cooperate to define an inlet area 34a of gap 34 that has the scoop size 42. Similarly, edges 32a4 and 32d4 define an outlet 34b having a size defining the gap width GW. In general, the scoop size 42 is larger than the gap width which means that the size of the inlet area is greater than the size of the channel at the outlet point. In the embodiment being described, the scoop size will be approximately 105–2000 percent of the gap width GW of gap 34. It has been found that as the size of the scoop 42 increases, a resulting increase in flow through the gap or channel 34 results. In general, the scoop size will be less than one-half inch for an automotive transmission environment. Also, in the embodiment being described, the features in FIG. 5 generate a flow of about 50 ml/min–7500 ml/min, depending on the size of the scoop 42 selected and the gap width GW of gap 34 and the size of the corner radius 99.

Referring back to FIGS. 3–5, note that the edges 32a1 and 32a3 are joined by the portion 40 that is nonlinear and defines a partial spiral that curves in a direction opposite the direction that a torque converter pressure plate (not shown) and front cover (not shown) rotates. In clutch plate or differential applications, the portion 40 that is nonlinear and defines a partial spiral may curve in a direction similar to or opposite to the direction that the plates rotate, or both. In one application, the dimension 42 and inlet area 34a of gap 34 and the corner radius 99 (FIG. 7) provide a flow of at least 1000 mil/min when a power transmission assembly (not shown) revolves in excess of 50 revolutions and inlet area 34a of gap 34 is exposed to a pressure of about at least 500 kPa. Thus, it should be appreciated that providing the corner radius 99 and at least a portion of an edge, such as portion 38 which joins edges 32d1 and 32d3, that is substantially straight in opposing relationship to portion 40 which joins edges 32a1 and 32a3 is curved, provides a scooping action that facilitates forcing fluid into the gap or channel 34.

FIG. 7 illustrates another embodiment of the invention showing a material segments 60a and 60b that are similar to the material segments 32a and 32d described relative to FIGS. 3–6B, but that also may have a recessed area 62, if of sufficient size, causes a suction effect on fluid flowing through the gap 34. This further facilitates increasing flow through the gap or channel 34. In this regard, the shape and size of the area 62 and distance represented by double arrow 64 is selected sized relative to the scoop size 42 so that a negative pressure is created which "pulls" fluid through the gap 34.

Figure 8A:
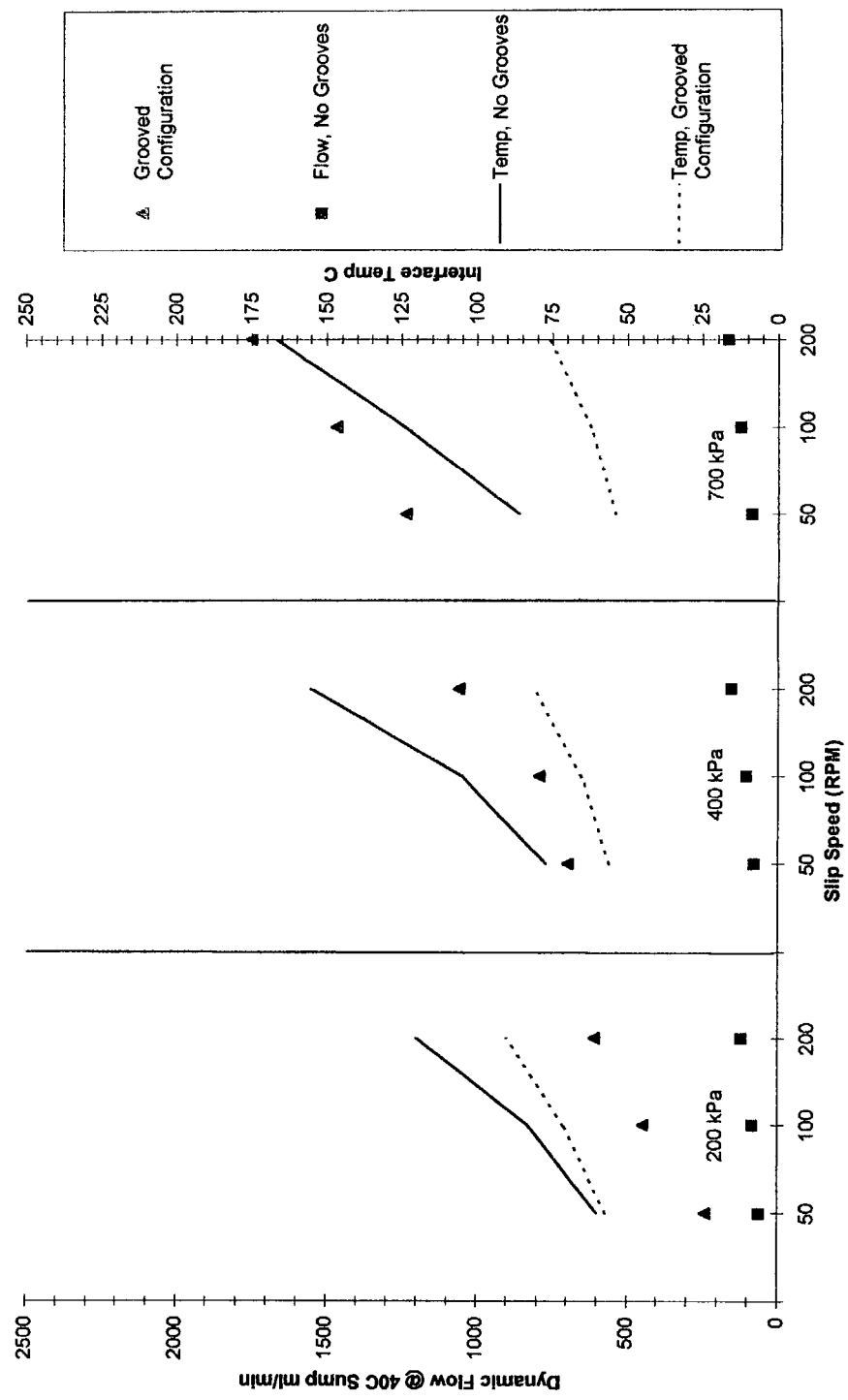
Figure 8B:
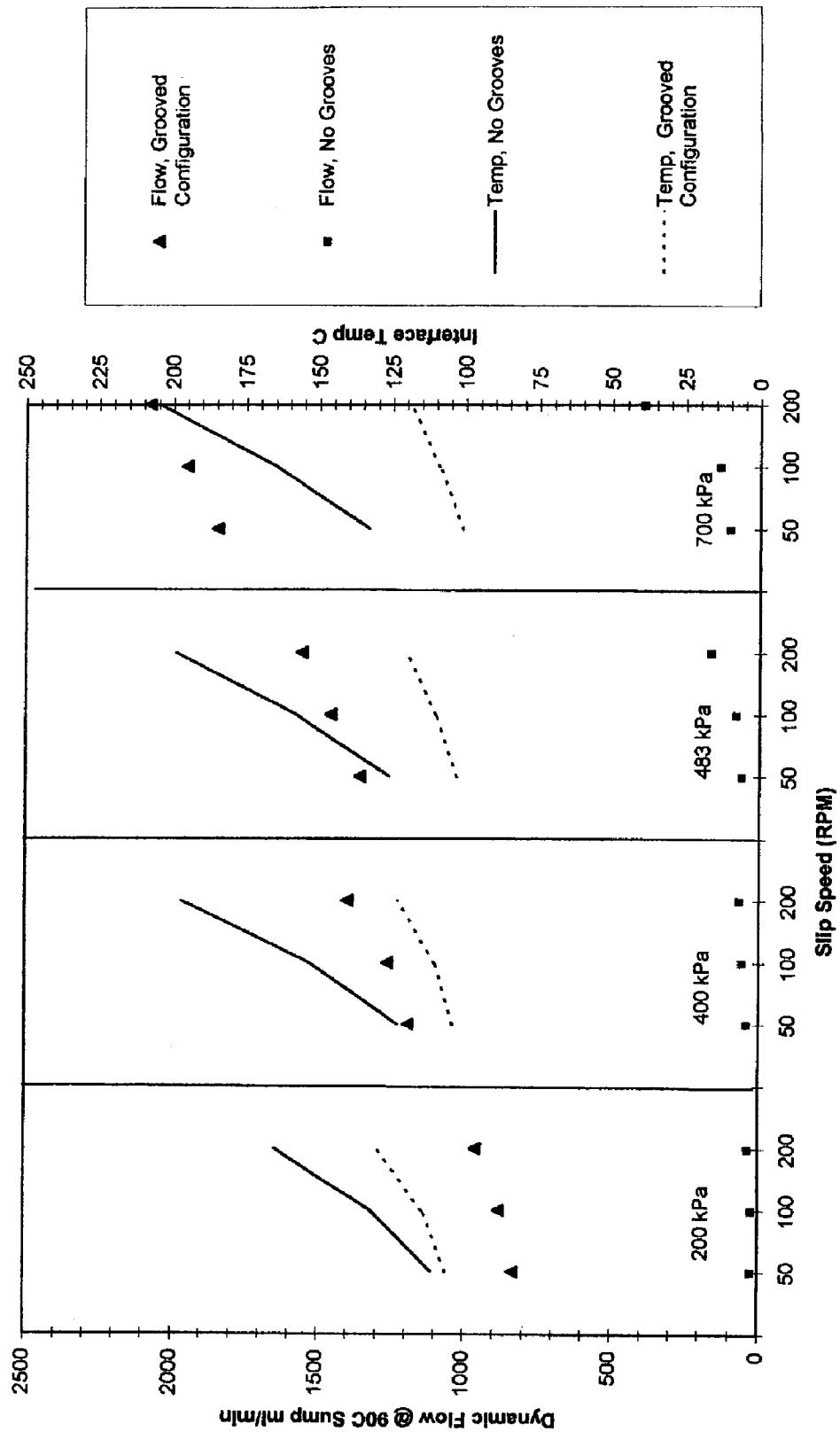

FIGS. 8A–8C illustrate various data results showing increases in the rate of flow and corresponding decreases in temperatures at various flow rates and slip speeds. FIGS. 8A, 8B and 8C illustrate flow rates of 40 C sump, 90 C sump, and 125 C sump, respectively. Note that on average, the flow rate increased 1100 ml/min with an average corresponding temperature decrease of 40 degrees C. when comparing a grooved configuration with a configuration with no grooves. This concept reduces clutch interface temperature.

The results in FIG. 8A–8C result from just a sweep angle and the scoop size as well as the corner radius 99 (FIG. 7) contour on the front edge of the friction material segment. A general manufacturing process for manufacturing the embodiments illustrated in the preceding discussion will now be described relative to FIGS. 9–10D.

Referring to FIG. 9, a general manufacturing and assembly process is shown comprising a plurality of stations. Initially, a non-laminated roll of friction material is densified to approximately the final thickness. At a station 50, a web of material 61 and adhesive film 63 are provided and laminated together using a press 66 as shown. The laminated material is then moved to station 68 where the material segments, such as the segments 24 illustrated in FIGS. 1 and 2 or segments 32a–32c illustrated in FIGS. 3–8C, are punched or cut with a punch 74 as shown. At station 70, a transfer unit 72 moves the cut segments from the cutting punch 74 to a locating cartridge 76 that is rotatably indexed. It should be understood that a plurality of segments are situated onto the cartridge 76. At station 78, a pick and place device comprising a plurality of placers 80 transfers the segments to a heated plate 81. At station 84, the heated plate 81 comprises the plurality of segments 30 in FIG. 3. A plurality of locating fixtures (not shown) may be used to arrange the plurality of segments 3a, 32d (FIG. 5) before pick and place unit moves and places the segments 32a, 32d. The segments are located in place using apertures 24, then picked up and placed in a ring for final assembly using the apertures 24 to ensure proper location.

In one application of the invention, it is desirable to provide the material in a complete ring 50 (FIG. 9A) before it is mounted on a core 14 (FIG. 1). It has been found that assembling a bottom ring or layer 50a having interlocking segments and a top ring or layer 50b of segments facilitates assembly and manufacture of the top layer. In one embodiment, a bottom ring or layer 90 (FIG. 10A) with a plurality of segments that are not Interlocked, using only locating apertures or locating surfaces for precise location to assemble layer 91 (FIG. 10B) facilitates ring assembly. As illustrated in FIG. 9A, one contemplated approach is to assemble the layers with a plurality of interlocking segments into a top layer 50a comprised of segments 50a1–50a4. The bottom layer 50b shown in phantom view in the phantom interlocks 50b1–50b4 of FIG. 9A. The top layer 50a comprises the plurality of interlocking segments 50a1–50a4 are then assembled and situated thereon. In the embodiment being described, the top and bottom layers 50a and 50b are positioned such that the interlocking joints are staggered so that they do not line up. Thus, the dual layer ring 50 is comprised of the bottom layer 50a (FIG. 9B) and the top layer 50b to define the assembled ring 50.

After the ring 50 is assembled as shown, the grooves 34 and locating apertures 35 may be provided in the assembled ring 50. For example, the top layer 50a may be cut or lasered, pressed or otherwise machined to provide the gap or channel 34 shown in FIG. 5. Thus, the assembled layers 50a and 50b provide the assembled ring 50 which is then lasered by a laser 70 (FIG. 9D) to provide the gap 34 having a gap depth GD of less than 100 percent of a combined thickness or ring depth RD of ring 50a and 50b. The depth at which the laser 70 (FIG. 9D) cuts the top layer and, if necessary, the bottom layer 50a and 50b may be varied to any desired depth according to desired fluid flow calculations to produce desired fluid flow as long as it is less than 100 percent of the ring depth RD illustrated in FIG. 9D.

FIGS. 10A–10E illustrate another embodiment of manufacturing a single piece assembled ring 90 (FIG. 10E), comprising the plurality of interlocking segments 90a–90d, to provide a bottom ring layer 91, as illustrated in FIG. 10A. As further illustrated in FIG. 10B–10DF, a top layer 93 is comprised of a plurality of non-interlocking segments 93a–93d as shown. During the process of assembling the embodiment shown in FIGS. 9–10DF, the top layers 50a and 93 comprise an adhesive (not shown) that facilitates tacking them to the bottom layer 50b or 91, respectively, prior to bonding.

In the embodiment illustrated in FIGS. 10A–10E, notice that by accurately positioning the segments 90a–90d onto bottom layer 91 as shown, the sweep angle θ and scoop size 42 (FIG. 5) referred to earlier are created.

In order to facilitate quickly aligning adjacent segments 93a–93d onto the bottom layer 91, a plurality of circular or square locating apertures or similar locating surfaces (FIGS. 5, 10B and 10E), such as aperture 24 in feature 24, may be used with one or more locating pins or squares on a dye (not shown). The material segments 93a–93d are situated on the bottom layer 91 and the grooves 34 are properly aligned and created, the ring 90 (FIG. 1E), comprised of the bottom layer 91 and material segments 93a–93d that form top layer 93, is now assembled and may be bonded to a part, such as a core 14, clutch plate, torque converter piston plate, or other plate.

Advantageously, these manufacturing methods provide means for providing a ring having a surface that is segmented to have the features described herein. The segments may be separately provided and situated on a ring, such as the interlocking ring or layer 91, or they may be provided by cutting, punching or applying the laser 70 (FIG. 9B) to provide the gaps 34 between material segments. Once the rings 50 or 90 are assembled or manufactured in the manner described, a one-piece ring is provided which can be easily used in a traditional clutch plate, torque converter pressure plate or transmission assembly environment.

Figure 11:
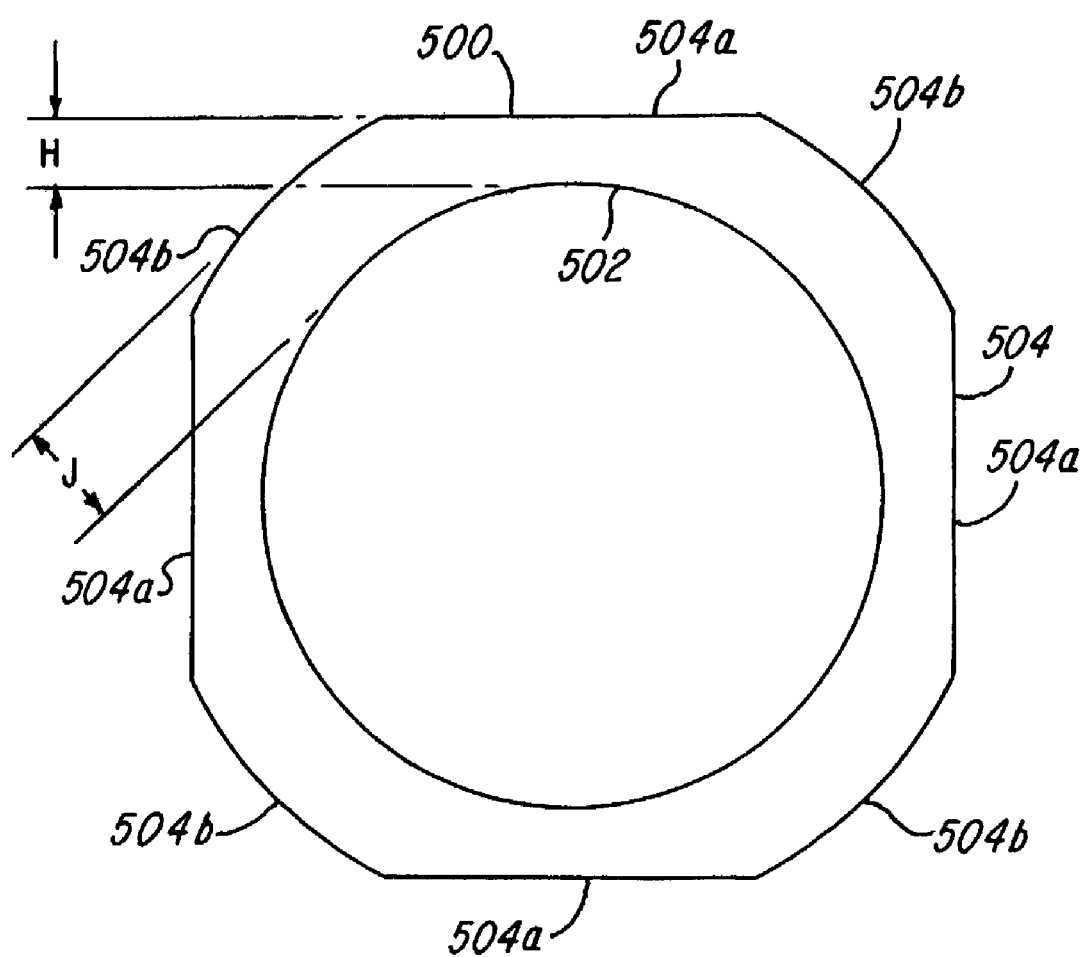
FIG. 11 illustrates an embodiment for a continuous 360 degree facing showing an inner diameter having an inner circumference that has a diameter that is larger than a maximum tooth diameter on a core on which the continuous facing is placed.

FIG. 11 illustrates another embodiment of the invention showing a facing material 500 comprising an inner circumference edge 502 and an outer edge 504. The outer edge 504 is comprised of a plurality of flat areas 504a and a plurality of round areas 504b. It has been found that providing a friction material having the shape shown facilitates reducing the material utilized. Note that the inside circumference or inner diameter 502 is a circle that has a diameter that is larger than the maximum tooth diameter on a core, such as core 14 shown in FIG. 1.

Referring back to FIG. 1, it should be understood, a distance between the innermost edge of the teeth 12 and the flat edge 20b is less than a distance G which is the distance between edge 20a and the innermost edge of teeth 12. Likewise, the distance H in FIG. 11, which is the distance between the edge 504a and inner circumferential edge 502, is less than the distance between the edge 504b and the inner circumferential edge 502. As stated earlier herein, it should be understood that providing the shape illustrated facilitates reducing the amount of material required to manufacture core 14 (FIG. 1) or continuous facing material (FIG. 11).

Figure 13:
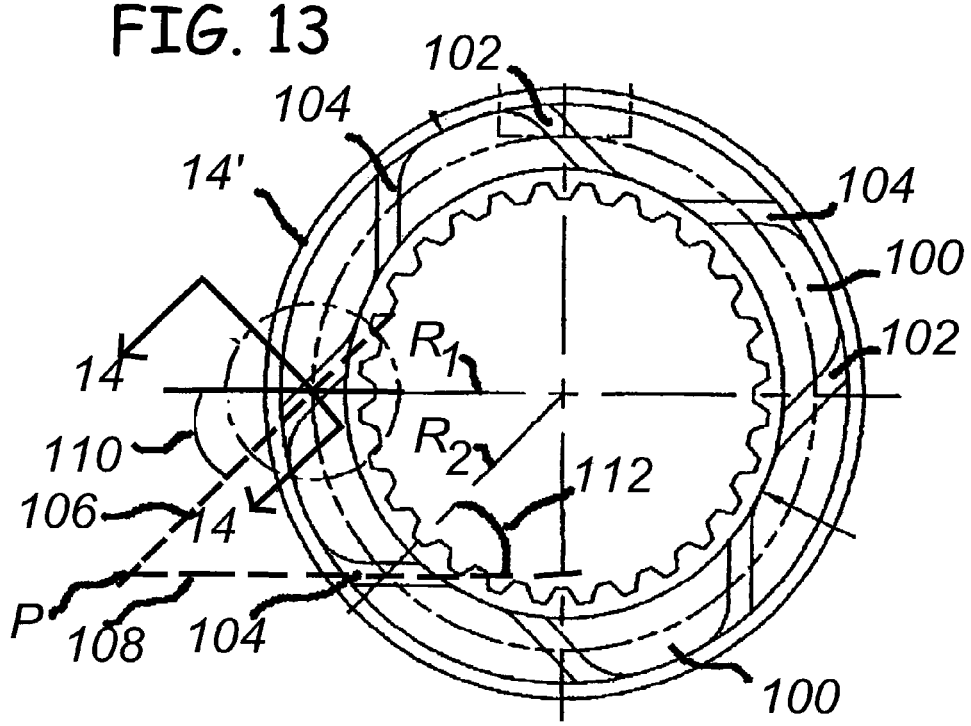
FIG. 13 is a view of an embodiment showing material densified 5 percent to 50 percent of thickness to create a groove.
Figure 14:
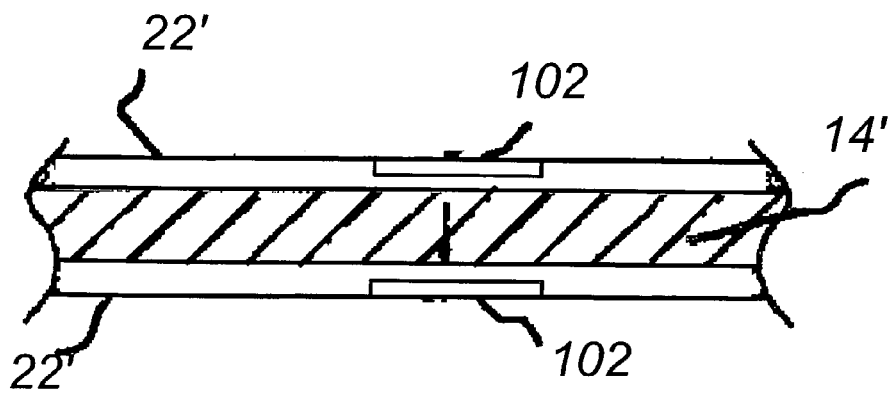
FIG. 14 is a cross-sectional view taken along line 14—14 in FIG. 13.

FIGS. 13 and 14 illustrate another embodiment wherein a die (not shown) may be used to press or densify the material segments 100 about 5 percent to 50 percent of its normal thickness to provide the groove 102, 104 which function in the same manner as the grooves 34 in the embodiment discussed earlier herein. Note that this embodiment may be provided with grooves 104. As illustrated, the grooves 104 comprise similar features as the groove described earlier herein and grooves 108 are similar to grooves 102, except for the orientation shown. The grooves 102 lie in a first plane 106 and grooves 104 lie in a second plane 108, and these planes 106 and 108 define angles 110 and 112, respectively, that are acute relative to a radial line $R_1$ and $R_2$, as shown. Note that the first and second planes 106 and 108 may be aligned such that they converge at a point P, as illustrated in FIG. 13.

In the embodiments being described, the friction material utilized in the various embodiments may be the materials described in U.S. Pat. No. 5,662,993 to Winkler, U.S. Pat. No. 4,639,392 to Nels, and U.S. Pat. No. 5,989,390 to Lee, and U.S. Pat. Nos. 5,615,758; 5,842,551; 5,998,311; 6,439,363; and 6,065,579 among others.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A clutch plate comprising:
   a core;
   a plurality of friction material segments situated on said core a first one of said plurality of friction material segments defining a first edge and a second one of said plurality of friction material segments defining a second edge, said first and second edges cooperating to define a gap therebetween, at least a portion of said gap being defined by said core and said first and second edges; and
   said first one of said plurality of friction material segments comprising a first outer edge and a corner between said outer edge and said first edge of said first one of said plurality of material segments;
   at least a portion of said second edge comprising a curvature defining a sweep angle and cooperating with said corner to define an inlet area to said gap that is generally wedge-shaped, said generally wedge-shaped inlet area causing an inlet pressure at said inlet area to be greater than an outlet pressure at an outlet area of said gap when said core rotates.

2. The clutch plate as recited in claim 1 wherein said curvature has a radius that is not constant.

3. The clutch plate as recited in claim 1 wherein only said second edge defines said sweep angle.

4. The clutch plate as recited in claim 1 wherein at least one of said first edge or said second edge is shaped to define a scoop having a predefined scoop size.

5. The clutch plate as recited in claim 3 wherein at least one of said first edge or said second edge is shaped to define a scoop having a predefined scoop size.

6. The clutch plate as recited in claim 4 wherein said predefined scoop size makes up no more than 180 degrees of a total annular radius of said core.

7. The clutch plate as recited in claim 5 wherein said predefined scoop size makes up no more than 180 degrees of a total annular radius of said core.

8. The clutch plate as recited in claim 1 wherein said first edge is straight and at least a portion of said second edge is curved to define said sweep angle.

9. The clutch plate as recited in claim 1 wherein said gap defines a channel area coupling said inlet area to said outlet area, said inlet area being larger than said outlet area or larger than minimum channel width.

10. The clutch plate as recited in claim 9 wherein said inlet area, said outlet area and said channel area are defined by said first edge and said second edge, wherein an inlet distance between said first edge and said second edge at said inlet area is greater than an outlet distance between said first edge and said second edge at said outlet area.

11. The clutch plate as recited in claim 1 wherein said second edge is non-linear and defines a partial spiral that curves in a direction opposite to the direction said core rotates during use, similar to the direction said core rotates during use, or a combination of both, depending on the specific application.

12. The clutch plate as recited in claim 1 wherein said first edge comprises a first edge start point, a first edge termination point and a first edge length therebetween, said second edge comprises a second edge start point, a second edge termination point and a second edge length therebetween, said first edge length being smaller than said second edge length.

13. The clutch plate as recited in claim 12 wherein said first edge length is at least 10 percent being smaller than said second edge length.

14. The clutch plate as recited in claim 12 wherein said inlet area faces upstream of a flow moving around an outer edge of said core, downstream of a flow moving around an outer edge of said core, or a combination of both.

15. The clutch plate as recited in claim 1 wherein each of said plurality of material segments comprises a side that may be used to define said first edge that is generally straight and a generally opposing side that is curved that may be used to define said second edge.

16. A clutch plate comprising:
a core;
a plurality of friction material segments situated on said core a first one of said plurality of friction material segments defining a first edge and a second one of said plurality of friction material segments defining a second edge, said first and second edges cooperating to define a gap therebetween; and
said first one of said plurality of friction material segments comprising a first outer edge and a corner between said first outer edge of said first edge of said first one of said plurality of material segments;
at least a portion of said second edge defining a sweep angle and cooperating with said corner to define an inlet area to said gap that is generally wedge-shaped, said generally wedge-shaped inlet area causing an inlet pressure at said inlet area to be greater than an outlet pressure at an outlet area of said gap when said core rotates, wherein at least one of said first edge and said second edge comprises a locating aperture or locating surface for facilitating locating said plurality of friction material segments on said core.

17. A clutch plate comprising:
a core;
a plurality of friction material segments situated on said core a first one of said plurality of friction material segments defining a first edge and a second one of said plurality of friction material segments defining a second edge, said first and second edges cooperating to define a gap therebetween; and
said first one of said plurality of friction material segments comprising a first outer edge and a corner between said first outer edge and said first edge of said first one of said plurality of material segments;
at least a portion of said second edge defining a sweep angle and cooperating with said corner to define an inlet area to said gap that is generally wedge-shaped, said generally wedge-shaped inlet area causing an inlet pressure at said inlet area to be greater than an outlet pressure at an outlet area of said gap when said core rotates;
wherein an interior edge of at least one of said plurality of friction material segments comprises a recessed area that causes a negative pressure to pull fluid through said gap.

18. A power transmission assembly comprising:
a plurality of friction plates, each separated by a reaction plate;
at least one of said plurality of friction plates comprising:
a core;
a plurality of friction material segments situated on said core such that at least two adjacent segments cooperate with said core to define a gap, with said core defining one boundary surface or wall of said gap;
said gap being defined by a first edge of a first one of said plurality of friction material segments and a second edge of a second one of said plurality of friction material segments; and
a corner radius joining an outer edge on said first one of said plurality of friction material segments and said first edge of said first one of said plurality of friction material segments;
said gap comprising a primary gap width and at least one of said first edge or said second edge having a curvature that defines a sweep angle, said gap width and said sweep angle and said corner radius being selected to define an inlet area to said gap that is generally wedge-shaped, said generally wedge-shaped inlet area facilitates causing an inlet pressure at said inlet area to be greater than an outlet pressure at an outlet area of said gap as said core rotates.

19. The power transmission assembly as recited in claim 18 wherein said curvature is not constant.

20. The power transmission assembly as recited in claim 19 wherein said sweep angle is at least 6 degrees.

21. The power transmission assembly as recited in claim 18 wherein at least one of said first edge or said second edge is shaped to define a scoop having a predefined scoop size.

22. The power transmission assembly as recited in claim 19 wherein at least one of said first edge or said second edge is shaped to define a scoop having a predefined scoop size.

23. The power transmission assembly as recited in claim 21 wherein said predefined scoop size makes up no more than 180 degrees of a total annular radius of said core.

24. The power transmission assembly as recited in claim 22 wherein said predefined scoop size makes up no more than 180 degrees of a total annular radius of said core.

25. The power transmission assembly as recited in claim 21 wherein at least a portion of said first edge is straight and said second edge is curved to define said scoop.

26. The power transmission assembly as recited in claim 18 wherein said gap defines a channel area coupling said inlet area to said outlet area, said inlet area being larger than said outlet area.

27. The power transmission assembly as recited in claim 26 wherein said inlet area, said outlet area and said channel area are defined by said first edge and said second edge, wherein an inlet distance between said first edge and said second edge at said inlet area is greater than an outlet distance between said first edge and said second edge at said outlet area.

28. The power transmission assembly as recited in claim 19 wherein at least a portion of said second edge is non-linear and defines a partial spiral that curves in a direction either opposite the direction said core rotates during use, similar to the direction said core rotates during use, or a combination of both, depending on the specific application.

29. The power transmission assembly as recited in claim 19 wherein said first edge comprises a first edge start point, a first edge termination point and a first edge length therebetween, said second edge comprises a second edge start point, a second edge termination point and a second edge length therebetween, said first edge length being smaller than said second edge length.

30. The power transmission assembly as recited in claim 29 wherein said first edge length is at least 10 percent being smaller than said second edge length.

31. The power transmission assembly as recited in claim 29 wherein said inlet area faces upstream of a flow moving around an outer edge of said core, downstream of a flow moving around an outer edge of said core, or a combination of both.

32. The power transmission assembly as recited in claim 19 wherein each of said plurality of friction material segments comprises said first edge that is generally straight and a generally opposing edge that is curved.

33. A power transmission assembly comprising:
a plurality of friction plates, each separated by a reaction plate;
at least one of said plurality of friction plates comprising:
a core;
a plurality of friction material segments situated on said core such that at least two adjacent segments define a gap therebetween;
said gap being defined by a first edge of a first one of said plurality of friction material segments and a second edge of a second one of said plurality of friction material segments; and
a corner radius between an outer edge on said first one of said plurality of friction material segments and said first edge of said first one of said plurality of friction material segments;
said gap comprising a primary gap width and at least one of said first edge or said second edge defining a sweep angle, said gap width and said sweep angle and said corner radius being selected to define an inlet area to said gap that is generally wedge-shaped, said generally wedge-shaped inlet area facilitates causing an in let pressure at said inlet area to be greater than an outlet pressure at an outlet area of said gap as said core rotates, wherein each of said plurality of friction material segments comprises said first edge that is generally straight and a generally opposing edge that is curved, wherein at least one of said first edge and said second edge comprises a locating aperture or locating surface for facilitating locating said plurality of friction material segments on said core.

34. A torque converter assembly comprising:
a piston plate;
a plurality of friction material segments situated on said piston plate such that at least two adjacent segments cooperate with a portion of said piston plate to define a gap therebetween at least a portion of said gap being defined by said core and said first and second edges;
said gap being defined by a first edge of a first one of said plurality of friction material segments and a second edge of a second one of said plurality of friction material segments; and
a corner joining the outer edge of said first one of said plurality of friction material segments and said first edge of said first one of said plurality of friction material segments;
said gap comprising a primary gap width, at least one of said first edge or second edge defining a sweep angle, said gap width, said sweep angle and said corner define an inlet area to said gap that is generally wedge-shaped, said generally wedge-shaped inlet area facilitates causing an inlet pressure at said inlet area to be greater than an outlet pressure at an outlet area of said gap as said piston plate rotates.

35. The torque converter assembly as recited in claim 34 wherein said second edge defines said sweep angle.

36. The torque converter assembly as recited in claim 35 wherein said sweep angle is at least 6 degrees.

37. The torque converter assembly as recited in claim 34 wherein at least one of said first edge or said second edge is shaped to define a scoop having a predefined scoop size.

38. The torque converter assembly as recited in claim 35 wherein at least one of said first edge or said second edge is shaped to define a scoop having a predefined scoop size.

39. The torque converter assembly as recited in claim 37 wherein said predefined scoop size makes up no more than 180 degrees of a total annular radius of piston plate.

40. The torque converter assembly as recited in claim 38 wherein said predefined scoop size makes up no more than 180 degrees of a total annular radius of piston plate.

41. The torque converter assembly as recited in claim 37 wherein said first edge is straight and at least a portion of said second edge is curved to define said scoop.

42. The torque converter assembly as recited in claim 34 wherein said gap defines a channel area coupling said inlet area to said outlet area, said inlet area being larger than said outlet area or larger than minimum channel width.

43. The torque converter assembly as recited in claim 34 wherein an inlet distance between said first edge and said second edge at said inlet area is greater than an outlet distance between said first edge and said second edge at said outlet area.

44. The torque converter assembly as recited in claim 34 wherein said second edge is non-linear and defines a partial spiral that curves in a direction opposite the direction said piston plate rotates during use or that the fluid flows if the piston plate is stationary.

45. The torque converter assembly as recited in claim 34 wherein said first edge comprises a first edge start point, a first edge termination point and a first edge length therebetween, said second edge comprises a second edge start point, a second edge termination point and a second edge length therebetween, said first edge length being smaller than said second edge length.

46. The torque converter assembly as recited in claim 45 wherein said first edge length is at least 10 percent being smaller than said second edge length.

47. The torque converter assembly as recited in claim 45 wherein said inlet area faces upstream of a flow moving around an outer edge of said piston plate or opposite the direction said piston plate rotates during use.

48. The torque converter assembly as recited in claim 34 wherein said gap provides a flow of at least 1000 ml/mm when said piston plate revolves in excess of 25 RPM and said inlet area of said gap comprises a scoop exposed to pressure of at least 400 kPa.

49. The torque converter assembly as recited in claim 34 wherein an interface temperature decreases by approximately 40° C. due to gap providing a flow of at least 1000 ml/mm when said piston plate revolves in excess of 25 RPM and said inlet area of said gap comprises a scoop exposed to pressure of at least 400 kPa.

50. The torque converter assembly as recited in claim 34 wherein each of said plurality of material segments comprises an edge that may be used to define said first edge that is generally straight and a generally opposing edge that is curved.

51. A torque converter assembly comprising:
a piston plate;
a plurality of friction material segments situated on said piston plate such that at least two adjacent segments define a gap therebetween;
said gap being defined by a first edge of a first one of said plurality of friction material segments and a second edge of a second one of said plurality of friction material segments; and
a corner joining the outer edge of said first one of said plurality of friction material segments and said first edge of said first one of said plurality of friction material segments;
said gap comprising a primary gap width, at least one of said first edge or second edge defining a sweep angle, said gap width, said sweep angle and said corner define an inlet area to said gap that is generally wedge-shaped, said generally wedge-shaped inlet area facilitates causing an inlet pressure at said inlet area to be greater than an outlet pressure at an outlet area of said gap as said piston plate rotates;
wherein each of said plurality of material segments comprises an edge that may be used to define said first edge that is generally straight and a generally opposing edge that is curved;
wherein at least one of said first edge and said second edge comprises a locating aperture or locating surface for facilitating locating said plurality of friction material segments on said piston plate.

52. A torque converter assembly comprising:
a piston plate;
a plurality of friction material segments situated on said piston plate such that at least two adjacent segments define a gap therebetween;
said gap being defined by a first edge of a first one of said plurality of friction material segments and a second edge of a second one of said plurality of friction material segments; and
a corner joining the outer edge of said first one of said plurality of friction material segments and said first edge of said first one of said plurality of friction material segments;
said gap comprising a primary gap width, at least one of said first edge or second edge defining a sweep angle, said gap width, said sweep angle and said corner define an inlet area to said gap that is generally wedge-shaped, said generally wedge-shaped inlet area facilitates causing an inlet pressure at said inlet area to be greater than an outlet pressure at an outlet area of said gap as said piston plate rotates;
wherein at least one of said first or second plurality of friction material segments comprises an interior edge comprising a recessed area that causes a negative pressure to pull fluid through said gap.

53. A power transmission assembly comprising:
a torque converter assembly comprising:
a piston plate;
a plurality of friction material segments situated on said piston plate such that at least two adjacent segments cooperate with a surface of said piston plate to define a gap therebetween, said gap having an outlet area and an inlet area;
said gap being defined by a first edge of a first one of said plurality of segments and a second edge of a second one of said plurality of segments; and
a corner radius between an outer circular edge and said first edge of said first one of said plurality of segments;
said gap comprising a primary gap width and at least one of said first edge or second edge having a curvature defining a sweep angle, said inlet area being generally wedge-shaped, said generally wedge-shaped inlet area facilitates causing an inlet pressure at said inlet area to be greater than an outlet pressure at an outlet area of said gap as said piston plate rotates.

54. The power transmission assembly as recited in claim 53 wherein only said second edge defines said sweep angle.

55. The power transmission assembly as recited in claim 54 wherein said sweep angle is at least 6 degrees.

56. The power transmission assembly as recited in claim 53 wherein at least one of said first edge or said second edge is shaped to define a scoop having a predefined scoop size.

57. The power transmission assembly as recited in claim 54 wherein at least one of said first edge or said second edge is shaped to define a scoop having a predefined scoop size.

58. The power transmission assembly as recited in claim 56 wherein said predefined scoop size makes up no more than 180 degrees of a total annular radius of said piston plate.

59. The power transmission assembly as recited in claim 57 wherein said predefined scoop size makes up no more than 180 degrees of a total annular radius of said piston plate.

60. The power transmission assembly as recited in claim 56 wherein at least a portion of said first edge is straight and said second edge is curved to define said scoop.

61. The power transmission assembly as recited in claim 53 wherein said gap defines an inlet area, an outlet area and a channel area coupling said inlet area to said outlet area, said inlet area being larger than said outlet area.

62. The power transmission assembly as recited in claim 53 wherein an inlet distance between said first edge and said second edge at said inlet area is greater than an outlet distance between said first edge and said second edge at said outlet area.

63. The power transmission assembly as recited in claim 53 wherein at least a portion of said second edge is non-linear and defines a partial spiral that curves in a direction either opposite the direction said piston plate rotates during use or that the fluid flows if the piston plate is stationary.

64. The power transmission assembly as recited in claim 53 wherein said first edge comprises a first edge start point, a first edge termination point and a first edge length therebetween, said second edge comprises a second edge start point, a second edge termination point and a second edge length therebetween, said first edge length being smaller than said second edge length.

65. The power transmission assembly as recited in claim 64 wherein said first edge length is at least 10 percent being smaller than said second edge length.

66. The power transmission assembly as recited in claim 64 wherein said inlet area faces upstream of a flow moving around an outer edge of said piston plate when either said fluid moves around said piston plate while said piston plate is stationary or said fluid moves around said piston plate when said piston rotates.

67. The power transmission assembly as recited in claim 53 wherein said gap provides a flow of at least 1000 ml/mm when said power transmission assembly revolves in excess of 25 RPM and said inlet area of said gap comprises a scoop exposed to pressure of at least 400 kPa.

68. The power transmission assembly as recited in claim 53 wherein said temperature decreases by approximately 40 degrees Celsius due to gap providing a flow of at least 1000 ml/mm when said piston plate revolves in excess of 25 RPM and said inlet area of said gap comprises a scoop exposed to pressure of at least 400 kPa.

69. The power transmission assembly as recited in claim 53 wherein each of said plurality of friction material segments comprises a first side that may be used to define said first edge that is generally straight and a generally opposing second side that is curved that may be used to define said second edge.

70. The power transmission assembly as recited in claim 69 wherein at least one of said first edge and said second edge comprises a locating aperture or locating surface for facilitating locating said plurality of material segments on said core.

71. A method for increasing fluid flow with increased relative speed between a friction surface of a friction member, and a cooperating surface, said method comprising the steps of:
determining a gap width and a sweep angle for a gap between adjacent friction material segments;
selecting a first one of said adjacent friction material segments comprising a first edge having a corner comprising a corner radius; said corner causing fluid to be wiped into an inlet area of said gap at a desired rate to cause an inlet pressure;
selecting a second one of said adjacent friction material segments comprising a second edge comprising a curved scoop having a scoop shape;
processing each of said adjacent friction material segments to provide said first edge that is substantially straight and said second edge comprising at a least a portion that is curved to define said scoop shape; and
arranging said adjacent friction material segments such that the first edge of said first one of said adjacent friction material segments is situated on said friction member in generally opposed relationship to said second edge of said second one of said adjacent friction material segments, said first edge and said second edge cooperating with at least a portion of said friction member to define said pap and to provide said inlet area that is generally wedge-shaped, said generally wedge-shaped inlet area facilitates causing said inlet pressure at said inlet area to be greater than an outlet pressure at an outlet area of said gap as said friction member rotates.

72. The method as recited in claim 71 wherein said scoop shape comprises a sweep angle that is at least 6 degrees.

73. The method as recited in claim 71 wherein at least one of said first edge or said second edge is shaped to define said scoop shape having a predefined scoop size.

74. The method as recited in claim 71 wherein said scoop has a predefined scoop opening that makes up no more than 180 degrees of a total annular radius of said friction member.

75. The method as recited in claim 71 wherein said gap defines a channel area coupling said inlet area to said outlet area, said inlet area being larger than said outlet area.

76. The method as recited in claim 71 wherein an inlet distance between said first edge and said second edge at said inlet area is greater than an outlet distance between said first edge and said second edge at said outlet area.

77. The method as recited in claim 71 wherein said second edge is non-linear and defines a partial spiral that curves in a direction opposite the direction said friction member rotates during use, the partial spiral curves in a direction either opposite the direction said friction member rotates during use, similar to the direction said friction member rotates during use, or a combination of both, depending on the specific application.

78. The method as recited in claim 71 wherein said first edge comprises a first edge start point, a first edge termination point and a first edge length therebetween, said second edge comprises a second edge start point, a second edge termination point and a second edge length therebetween, said first edge length being smaller than said second edge length.

79. The method as recited in claim 78 wherein said first edge length is at least 10 percent smaller than said second edge length.

80. The method as recited in claim 78 wherein said inlet area faces upstream of a flow that either moves around an outer edge of said friction member, faces upstream, downstream, or a combination of both in an application that rotates in a stationary fluid.

81. The method as recited in claim 71 for a friction member application wherein said gap provides a flow of at least 1000 ml/mm when said friction member revolves in excess of 25 RPM and said inlet area of said gap comprises said scoop exposed to pressure of at least 400 kPa.

82. The method as recited in claim 71 wherein said temperature decreases by approximately 40 degrees Celsius due to the gap providing a flow of at least 1000 ml/mm when said piston plate revolves in excess of 25 RPM and said inlet area of said gap comprises said scoop exposed to pressure of at least 400 kPa.

83. The method as recited in claim 71 wherein each of said adjacent friction material segments comprises a first edge that is generally straight and a generally opposing second edge that is curved.

84. A method for increasing fluid flow with increased relative speed between a friction surface of a friction member, and a cooperating surface, said method comprising the steps of:
  determining a gap width and a sweep angle for a gap between adjacent friction material segments;
  selecting a first one of said adjacent friction material segments comprising a first edge and a corner comprising a corner radius; said corner causing fluid to be wiped into an inlet area of said gap at a desired rate to cause an inlet pressure;
  selecting a second one of said adjacent friction material segments comprising a second edge comprising a scoop having a scoop shape;
  processing each of said adjacent friction material segments to provide said first edge that is substantially straight and said second edge comprising at least a portion that is curved to define said scoop shape; and
  arranging said adjacent friction material segments such that the first edge of said first one of said adjacent friction material segments is situated on said friction member in generally opposed relationship to said second edge of said second one of said adjacent friction material segments, to define said inlet area that is generally wedge-shaped to facilitate causing said inlet pressure at said inlet area to be greater than an outlet pressure at an outlet area of said gap as said friction member rotates,
  wherein each of said adjacent friction material segments comprises a first edge that is generally straight and a generally opposing second edge that is curved,
  wherein at least one of said first edge and said second edge comprises a locating aperture for facilitating locating said adjacent friction material segments on said core or piston plate.

85. A method for increasing fluid flow with increased relative speed between a friction surface of a friction member, and a cooperating surface, said method comprising the steps of:
  determining a gap width and a sweep angle for a gap between adjacent friction material segments;
  selecting a first one of said adjacent friction material segments comprising a first edge having a corner comprising a corner radius; said corner causing fluid to be wiped into an inlet area of said gap at a desired rate to cause an inlet pressure;
  selecting a second one of said adjacent friction material segments comprising a second edge comprising a scoop having a scoop shape;
  processing each of said adjacent friction material segments to provide said first edge that is substantially straight and said second edge comprising at least a portion that is curved to define said scoop shape; and
  arranging said adjacent friction material segments such that the first edge of said first one of said adjacent friction material segments is situated on said friction member in generally opposed relationship to said second edge of said second one of said adjacent friction material segments, to define said inlet area that is generally wedge-shaped, said generally wedge-shaped inlet area to facilitate causing said inlet pressure at said inlet area to be greater than an outlet pressure at an outlet area of said gap as said friction member rotates,
  wherein each of said adjacent friction material segments comprises a first edge that is generally straight and a generally opposing second edge that is curved,
  wherein at least one of said first edge and said second edge comprises a locating aperture for facilitating locating said adjacent friction material segments on said core or piston plate,
  wherein said locating aperture comprises a reservoir to increase cooling by facilitating an increased amount of fluid flow into the gap.

86. A clutch plate comprising:
  a core;
  a plurality of friction material segments situated on said core a first one of said plurality of friction material segments defining a first edge and a second one of said plurality of friction material segments defining a second edge, said first and second edges cooperating to define a gap therebetween; and
  said first one of said plurality of friction material segments comprising a first outer edge and a corner between said first outer edge and said first edge of said first one of said plurality of material segments;
  at least a portion of said second edge defining a sweep angle and cooperating with said corner to define an inlet area to said gap that is generally wedge-shaped to facilitate an inlet pressure at said inlet area to be greater than an outlet pressure at an outlet area of said gap when said core rotates;
  wherein at least a portion of said first edge defines a second sweep angle and cooperates with said second edge to define a second wedge shape at said outlet area to further facilitate causing said outlet pressure at said outlet area to be less than said inlet pressure at said inlet area of said gap.

87. A power transmission assembly comprising:
  a plurality of friction plates, each separated by a reaction plate;
  at least one of said plurality of friction plates comprising:
  a core;
  a plurality of friction material segments situated on said core such that at least two adjacent segments define a gap therebetween;
  said gap being defined by a first edge of a first one of said plurality of friction material segments and a second edge of a second one of said plurality of friction material segments;
  a corner joining an outer edge on said first one of said plurality of friction material segments and said first edge of said first one of said plurality of friction material segments;
  said gap comprising a primary gap width and at least one of said first edge or said second edge defining a sweep angle, said gap width and said sweep angle and said corner radius being selected to define an inlet area to said gap that is generally wedge-shaped to facilitate causing an inlet pressure at said inlet area to be greater than an outlet pressure at an outlet area of said gap as said core rotates;
  wherein at least a portion of said first edge defines a second sweep angle and cooperates with said second edge to define a second wedge shape at said outlet area to further facilitate causing said outlet pressure at said outlet area to be less than said inlet pressure at said inlet area of said gap.

88. A torque converter assembly comprising:
  a piston plate;
  a plurality of friction material segments situated on said piston plate such that at least two adjacent segments define a gap therebetween;
  said gap being defined by a first edge of a first one of said plurality of friction material segments and a second edge of a second one of said plurality of friction material segments; and
  a corner joining the outer edge of said first one of said plurality of friction material segments and said first edge of said first one of said plurality of friction material segments said gap comprising a primary gap width, at least one of said first edge or second edge defining a sweep angle, said gap width, said sweep angle and said corner define an inlet area to said gap that is generally wedge-shaped to facilitate causing an inlet pressure at said inlet area to be greater than an outlet pressure at an outlet area of said gap as said piston plate rotates;

wherein at least a portion of said first edge defines a second sweep angle and cooperates with said second edge to define a second wedge shape at said outlet area to facilitate causing said outlet pressure at said outlet area to be less than said inlet pressure at said inlet area of said gap.

89. A power transmission assembly comprising:
a torque converter assembly comprising:
a piston plate;
a plurality of friction material segments situated on said piston plate such that at least two adjacent segments define a gap therebetween, said gap having an outlet area and an inlet area;
said gap being defined by a first edge of a first one of said plurality of segments and a second edge of a second one of said plurality of segments; and
a corner having a corner radius, said corner connecting the outer circular edge of the segment and the first edge of said plurality of segments;
    said gap comprising a primary gap width and at least one of said first edge or second edge defining a sweep angle, said inlet area being generally wedge-shaped to facilitate causing an inlet pressure at said inlet area to be greater than an outlet pressure at an outlet area of said gap as said piston plate rotates;
wherein at least a portion of said first edge defines a second sweep angle and cooperates with said second edge to define a second wedge shape at said outlet area to further facilitate causing said outlet pressure at said outlet area to be less than said inlet pressure at said inlet area of said gap.

90. A clutch plate comprising:
a core;
a plurality of friction material segments situated on said core a first one of said plurality of friction material segments defining a first edge and a second one of said plurality of friction material segments defining a second edge, said first and second edges cooperating to define a gap therebetween; and
said first one of said plurality of friction material segments comprising a first outer edge and a corner between said first outer edge and said first edge of said first one of said plurality of material segments;
at least a portion of said second edge defining a sweep angle and cooperating with said corner to define an inlet area to said gap that is generally wedge-shaped, said generally wedge-shaped inlet area causing an inlet pressure at said inlet area to be greater than an outlet pressure at an outlet area of said gap when said core rotates;
wherein said outlet area is configured to provide a negative pressure as said clutch plate rotates.

91. A power transmission assembly comprising:
a plurality of friction plates, each separated by a reaction plate;
at least one of said plurality of friction plates comprising:
a core;
a plurality of friction material segments situated on said core such that at least two adjacent segments define a gap therebetween;
said gap being defined by a first edge of a first one of said plurality of friction material segments and a second edge of a second one of said plurality of friction material segments; and
a corner having a corner radius, said corner joining an outer edge on said first one of said plurality of friction material segments and said first edge of said first one of said plurality of friction material segments;
said gap comprising a primary gap width and at least one of said first edge or said second edge defining a sweep angle, said gap width and said sweep angle and said corner radius being selected to define an inlet area to said gap that is generally wedge-shaped to facilitate causing an inlet pressure at said inlet area to be greater than an outlet pressure at an outlet area of said gap as said core rotates;
wherein said outlet area is configured to provide a negative pressure as said clutch plate rotates.

92. A torque converter assembly comprising:
a piston plate;
a plurality of friction material segments situated on said piston plate such that at least two adjacent segments define a gap therebetween;
said gap being defined by a first edge of a first one of said plurality of friction material segments and a second edge of a second one of said plurality of friction material segments; and
a corner between the outer edge of said first one of said plurality of friction material segments and said first edge of said first one of said plurality of friction material segments
said gap comprising a primary gap width, at least one of said first edge or second edge defining a sweep angle, said gap width, said sweep angle and said corner define an inlet area to said gap that is generally wedge-shaped to facilitate causing an inlet pressure at said inlet area to be greater than an outlet pressure at an outlet area of said gap as said piston plate rotates;
wherein said outlet area is configured to provide a negative pressure as said clutch plate rotates.

93. A power transmission assembly comprising:
a torque converter assembly comprising:
a piston plate;
a plurality of friction material segments situated on said piston plate such that at least two adjacent segments define a gap therebetween, said gap having an outlet area and an inlet area;
said gap being defined by a first edge of a first one of said plurality of segments and a second edge of a second one of said plurality of segments; and
a corner between an outer circular edge and said first edge of said first one of said plurality of segments: said corner having a corner radius;
    said gap comprising a primary gap width and at least one of said first edge or second edge defining a sweep angle, said inlet area being generally wedge-shaped to facilitate causing an inlet pressure at said inlet area to be greater than an outlet pressure at an outlet area of said gap as said piston plate rotates;
wherein said outlet area is configured to provide a negative pressure as said clutch plate rotates.

94. The method as recited in claim 71 wherein said friction member is a clutch plate, core, torque converter or syncronizer ring.

* * * * *